United States Patent
Matsushita et al.

(10) Patent No.: US 12,186,828 B2
(45) Date of Patent: Jan. 7, 2025

(54) DOUBLE-SIDED FRICTION STIR WELDING METHOD, METHODS FOR PRODUCING COLD-ROLLED STEEL STRIP AND COATED STEEL STRIP, DOUBLE-SIDED FRICTION STIR WELDING APPARATUS, AND FACILITIES FOR PRODUCING COLD-ROLLED STEEL STRIP AND COATED STEEL STRIP

(71) Applicant: JFE STEEL CORPORATION, Tokyo (JP)

(72) Inventors: Muneo Matsushita, Tokyo (JP); Shohei Iwata, Tokyo (JP); Yasushi Kitani, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 347 days.

(21) Appl. No.: 17/764,090

(22) PCT Filed: Sep. 18, 2020

(86) PCT No.: PCT/JP2020/035410
§ 371 (c)(1),
(2) Date: Mar. 25, 2022

(87) PCT Pub. No.: WO2021/060176
PCT Pub. Date: Apr. 1, 2021

(65) Prior Publication Data
US 2022/0371119 A1    Nov. 24, 2022

(30) Foreign Application Priority Data
Sep. 25, 2019   (JP) ................................ 2019-173666

(51) Int. Cl.
*B23K 20/00*   (2006.01)
*B23K 20/12*   (2006.01)
(Continued)

(52) U.S. Cl.
CPC ...... *B23K 20/1255* (2013.01); *B23K 20/1225* (2013.01); *B23K 20/123* (2013.01); *B23K 2101/18* (2018.08); *B23K 2103/04* (2018.08)

(58) Field of Classification Search
CPC ............ B23K 20/1255; B23K 20/1265; B23K 20/122; B23K 20/123; B23K 20/125
See application file for complete search history.

(56) References Cited

U.S. PATENT DOCUMENTS

| 7,234,626 | B2* | 6/2007 | Trapp | ................. | B23K 20/1255 |
| | | | | | 228/112.1 |
| 7,404,510 | B2* | 7/2008 | Trapp | ................. | B23K 20/1255 |
| | | | | | 228/2.1 |

(Continued)

FOREIGN PATENT DOCUMENTS

| CN | 101559537 A | 10/2009 |
| CN | 102481659 A | 5/2012 |

(Continued)

OTHER PUBLICATIONS

Jan. 18, 2023 Office Action issued in Chinese Patent Application No. 202080066059.4.

(Continued)

*Primary Examiner* — Erin B Saad
(74) *Attorney, Agent, or Firm* — Oliff PLC

(57) ABSTRACT

A double-sided friction stir welding method, methods for producing a cold-rolled steel strip and a coated steel strip, a double-sided friction stir welding apparatus, and facilities for producing a cold-rolled steel strip and a coated steel strip. The double-sided friction stir welding method includes pressing two rotating tools, which are disposed on a first surface and a second surface of a butt portion or overlap portion of the steel strips, against the butt portion or overlap portion of steel strips and moving the rotating tools in the welding direction while rotating the rotating tools in oppo- (Continued)

site directions to each other, so that an unwelded portion of the steel strips is softened by frictional heat generated between the rotating tools and the unwelded portion of the steel strips, and the softened portion is stirred with the rotating tools to generate plastic flow so as to weld the steel strips together.

5 Claims, 14 Drawing Sheets

(51) Int. Cl.
*B23K 101/18* (2006.01)
*B23K 103/04* (2006.01)

(56) References Cited

U.S. PATENT DOCUMENTS

| | | | | |
|---|---|---|---|---|
| 7,416,102 | B1* | 8/2008 | Trapp | B23K 20/1255 228/2.1 |
| 7,882,998 | B2* | 2/2011 | Roos | B23K 20/126 228/2.1 |
| 7,931,185 | B2 | 4/2011 | Aliaga et al. | |
| 8,052,033 | B2* | 11/2011 | Nakagawa | B29C 66/1162 228/2.1 |
| 8,220,694 | B2* | 7/2012 | Nakagawa | B23K 20/1255 228/2.1 |
| 2002/0158109 | A1* | 10/2002 | Gendoh | B23K 20/1255 228/2.1 |
| 2006/0086775 | A1* | 4/2006 | Trapp | B23K 20/1225 228/2.1 |
| 2006/0138197 | A1* | 6/2006 | Aota | B23K 20/1265 228/112.1 |
| 2006/0289608 | A1* | 12/2006 | Steel | B23K 20/22 228/101 |
| 2007/0057015 | A1 | 3/2007 | Colligan | |
| 2007/0228102 | A1* | 10/2007 | Trapp | B23K 20/1255 228/2.1 |
| 2008/0257936 | A1* | 10/2008 | Trapp | B23K 20/124 228/2.3 |
| 2009/0056404 | A1* | 3/2009 | Fujii | C21D 1/06 72/342.1 |
| 2011/0135954 | A1* | 6/2011 | Nakagawa | B29C 66/114 428/615 |
| 2011/0180587 | A1* | 7/2011 | Trapp | B23K 20/1265 228/2.1 |
| 2012/0018492 | A1 | 1/2012 | Nakagawa et al. | |
| 2016/0354861 | A1* | 12/2016 | Xu | B23K 20/227 |
| 2017/0157720 | A1* | 6/2017 | Sato | B23K 20/12 |
| 2017/0259371 | A1* | 9/2017 | Kato | B23K 20/125 |
| 2020/0164462 | A1* | 5/2020 | Hori | F28F 3/12 |
| 2020/0254556 | A1* | 8/2020 | Hori | B23K 20/1255 |
| 2020/0282489 | A1* | 9/2020 | Hori | B23K 20/1255 |
| 2020/0299796 | A1 | 9/2020 | Dechassey et al. | |
| 2021/0069838 | A1* | 3/2021 | Ano | B23P 6/04 |
| 2022/0364209 | A1* | 11/2022 | Ghosh | C22C 26/00 |
| 2023/0143286 | A1* | 5/2023 | Rodriguez Suarez | B23K 20/22 228/2.1 |

FOREIGN PATENT DOCUMENTS

| | | |
|---|---|---|
| CN | 102601516 A | 7/2012 |
| CN | 111867777 A | 10/2020 |
| EP | 1 992 442 A1 | 11/2008 |
| EP | 2 202 025 A1 | 6/2010 |
| EP | 2474382 A1 | 7/2012 |
| EP | 3 738 705 A1 | 11/2020 |
| GB | 2306366 A | 5/1997 |
| JP | S48-38385 A | 6/1973 |
| JP | S48-38388 A | 6/1973 |
| JP | S51-85103 A | 7/1976 |
| JP | S62-183979 U | 11/1987 |
| JP | H32-61433 A | 11/1991 |
| JP | H07-505090 A | 6/1995 |
| JP | 2003-181655 A | 7/2003 |
| JP | 2003-290936 A | 10/2003 |
| JP | 2004-195480 A | 7/2004 |
| JP | 2010-90418 A | 4/2010 |
| JP | 2011-115846 A | 6/2011 |
| JP | 2015-127063 A | 7/2015 |
| RU | 2 421 313 C2 | 6/2011 |
| RU | 2 518 816 C2 | 6/2014 |
| WO | 2017/163115 A1 | 9/2017 |
| WO | 2019/054400 A1 | 3/2019 |

OTHER PUBLICATIONS

Nov. 25, 2023 Office Action issued in Korean Patent Application No. 10-2022-7009559.
Apr. 12, 2021 Office Action issued in Taiwanese Patent Application No. 109132943.
Nov. 2, 2021 Office Action issued in Japanese Patent Application No. 2021-510239.
Nov. 23, 2022 Office Action issued in Russian Patent Application No. 2022107206.
Aug. 30, 2022 Office Action issued in Russian Patent Application No. 2022107206.
Nov. 11, 2022 Search Report issued in European Patent Application No. 20867841.7.
May 27, 2023 Office Action issued in Chinese Patent Application No. 202080066059.4.
Dec. 8, 2020 International Search Report issued in International Application No. PCT/JP2020/035410.

* cited by examiner

FIG. 3
(a)
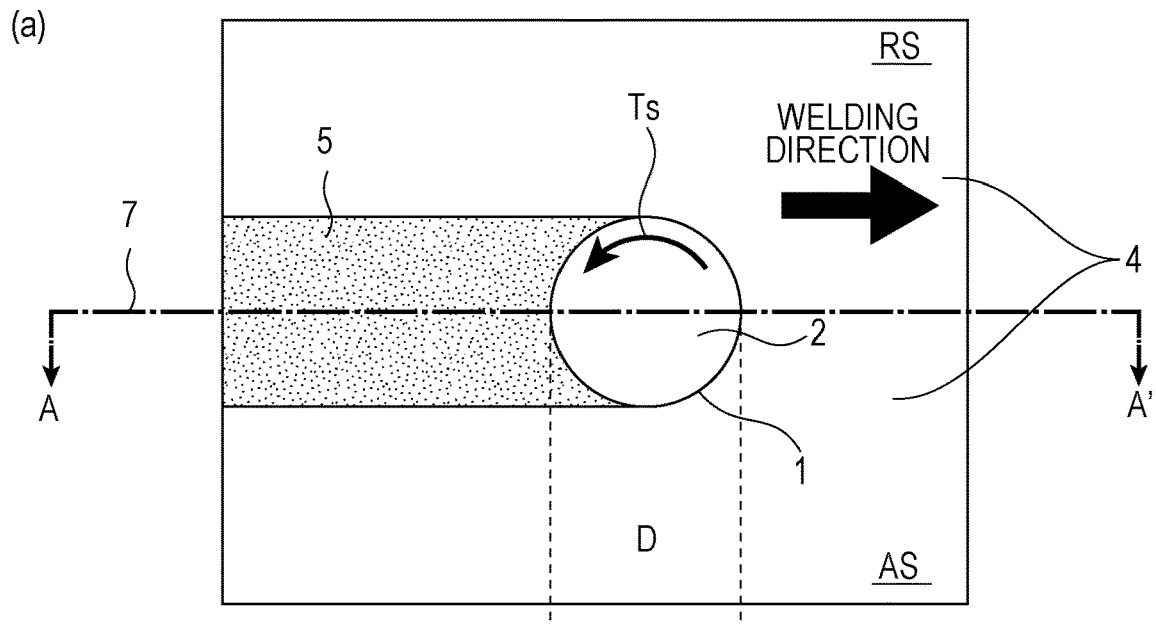
(b)
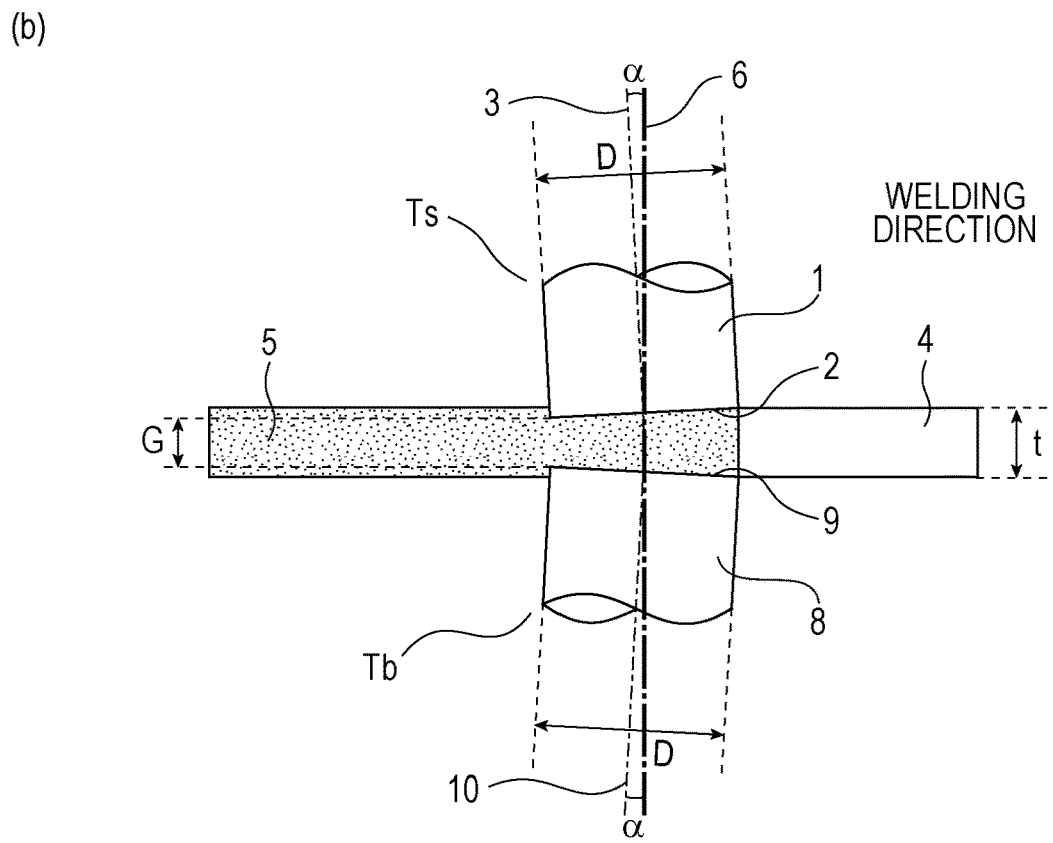

FIG. 8
(a)
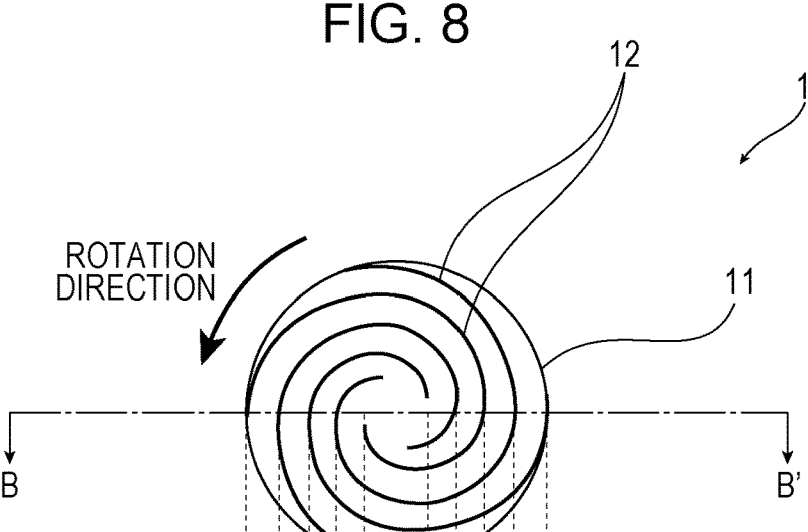
(b)
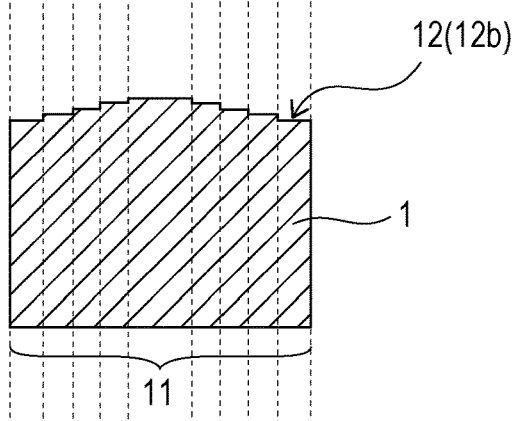
(c)
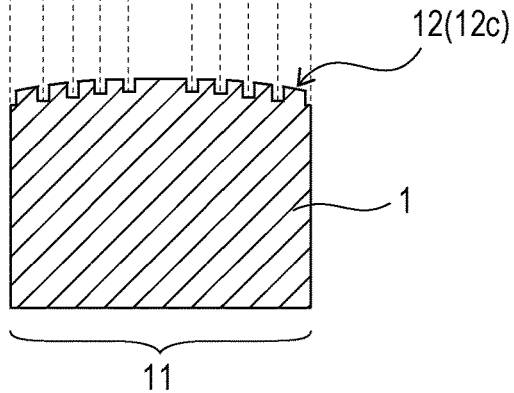

FIG. 9
(1) 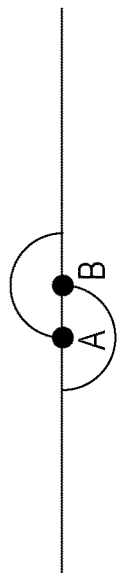
(2) 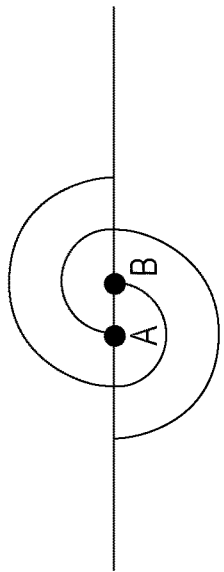
(3) 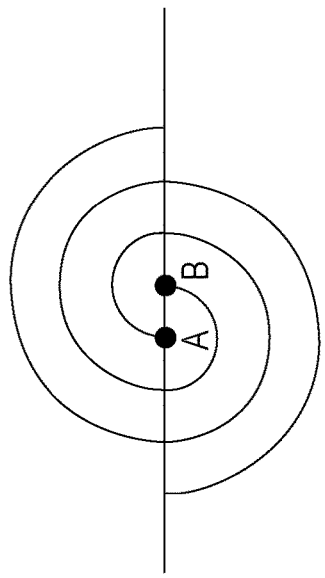
(4) 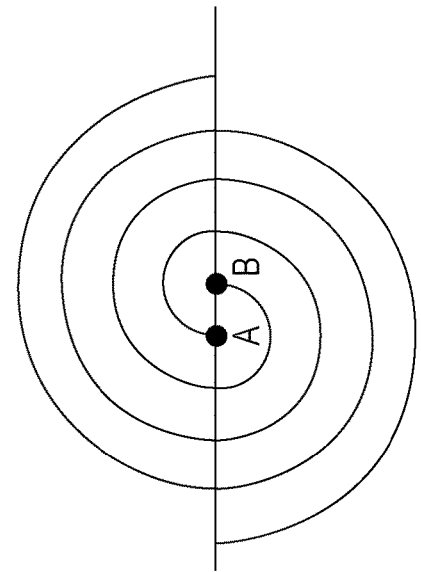

FIG. 11
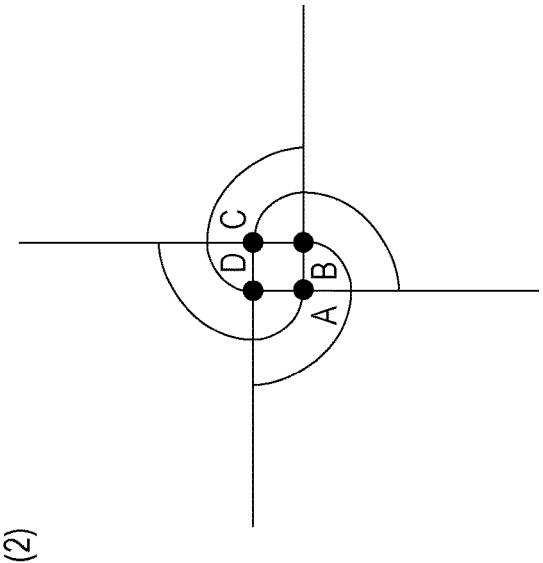
(2)
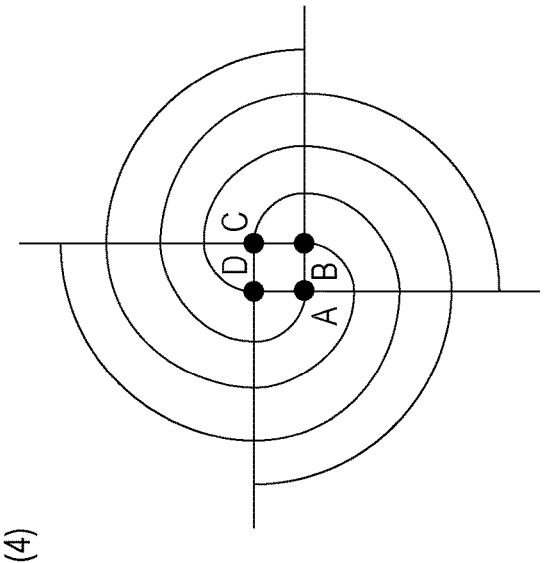
(4)
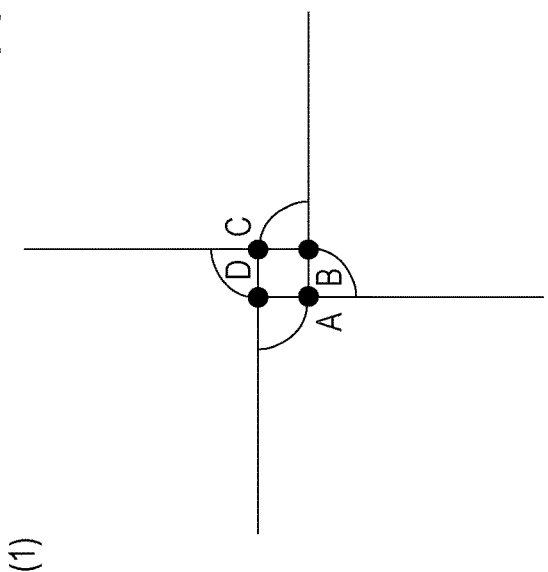
(1)
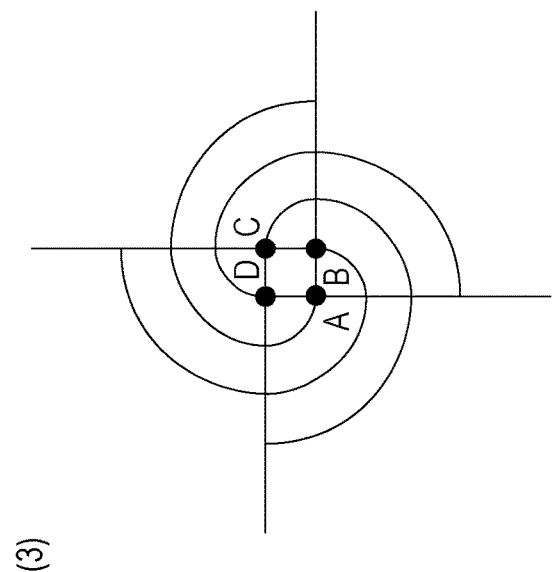
(3)

FIG. 13
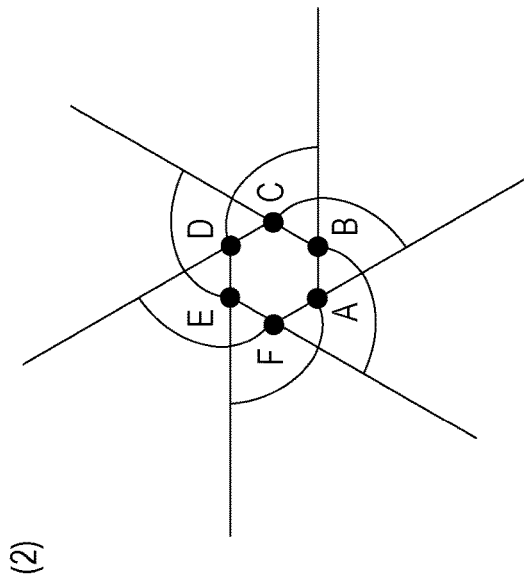
(1)
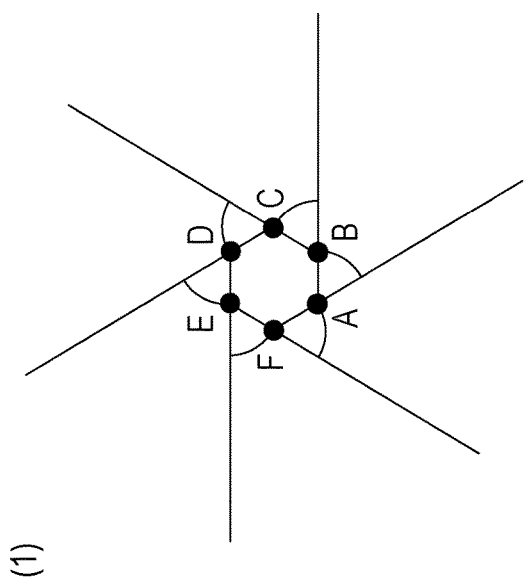
(2)
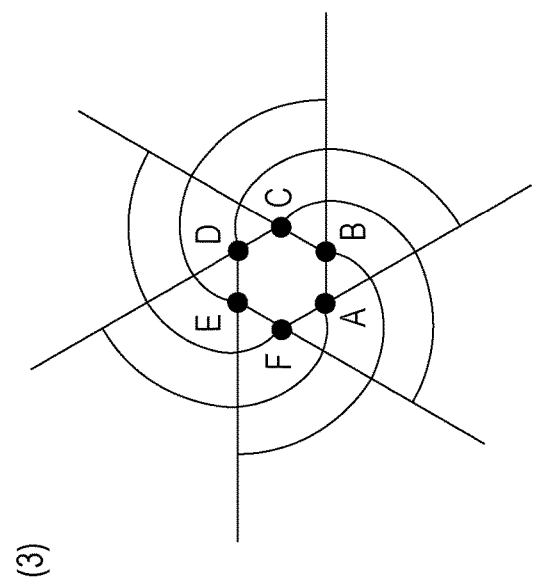
(3)
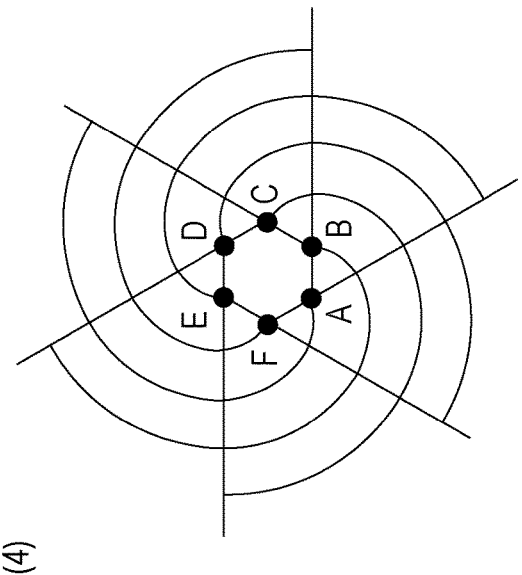
(4)

DOUBLE-SIDED FRICTION STIR WELDING METHOD, METHODS FOR PRODUCING COLD-ROLLED STEEL STRIP AND COATED STEEL STRIP, DOUBLE-SIDED FRICTION STIR WELDING APPARATUS, AND FACILITIES FOR PRODUCING COLD-ROLLED STEEL STRIP AND COATED STEEL STRIP

TECHNICAL FIELD

This application relates to a double-sided friction stir welding method and a double-sided friction stir welding apparatus for steel strips, in which steel strips are welded together by rotating two opposing rotating tools in opposite directions to each other in butt welding or lap welding between the tailing end of a preceding steel strip and the leading end of a following steel strip. The application also relates to methods for producing a cold-rolled steel strip and a coated steel strip using the double-sided friction stir welding method, and facilities for producing a cold-rolled steel strip and a coated steel strip.

BACKGROUND

Patent Literature 1 discloses a technique for welding a pair of workpieces such as steel strips by rotating both or one of the steel strips so as to generate frictional heat that softens the steel strips and stirring the softened portion so as to cause plastic flow.

However, the technique described in Patent Literature 1 requires rotating workpieces such as steel strips and thus limits the shape and the dimensions of workpieces such as steel strips.

A friction welding method different from Patent Literature 1 is disclosed in, for example, Patent Literature 2. In Patent Literature 2, a rotating tool (may hereinafter be simply referred to as a "tool") that has a probe (may hereinafter be simply referred to as a "pin") made of a material substantially harder than workpieces, such as steel strips, is inserted into an unwelded portion of steel strips, and the rotating tool is moved while rotating. The heat and plastic flow generated between the rotating tool and the steel strips are used to continuously weld the steel strips together in the longitudinal direction in this method. In the present specification, a portion in which steel strips are butted together or overlapped each other and that has not yet been welded will hereinafter be referred to as an "unwelded portion", and a portion that has been welded and integrated will hereinafter be referred to as a "welded portion".

As described above, the friction welding method described in Patent Literature 1 involves rotating steel strips and welding the steel strips together using the frictional heat between the steel strips. The friction stir welding method described in Patent Literature 2 involves welding steel strips together by rotating and moving rotating tools with the steel strips fixed in place. A friction stir welding method thus has an advantage in that, even if members having a substantially infinite length are welded together, the members can be continuously subjected to solid-state welding in the longitudinal direction of the members. Since the friction stir welding method is solid-state welding that uses metal plastic flow caused by the frictional heat generated between the rotating tool and the steel strips, welding can be performed without melting an unwelded portion. Furthermore, the friction stir welding method has many advantages of, for example, less deformation after welding because of low heating temperature, fewer defects in a welded portion as a result of not melting steel strips, and no necessity for a filler material.

A friction stir welding method has a wide range of applications in the fields of aircrafts, ships, railway vehicles, and automobiles, and other fields as a method for welding low-melting-point metal materials, such as aluminum alloys and magnesium alloys. This is because such low-melting-point metal materials are unlikely to provide a welded portion having satisfactory properties in an arc welding method of the related art, but can provide a welded portion (joint) having a high quality with high productivity in the friction stir welding method.

The use of the friction stir welding method for structural steel mainly used as materials of structures, such as buildings, ships, heavy equipment, pipelines, and automobiles, can avoid brittleness resulting from segregation of impurities during melting and solidification, and embrittlement resulting from hydrogen intrusion, which have been problems in fusion welding of the related art. At the same time, the microstructures of steel materials are less likely to change. For these, the joint performance may be improved. In addition, stirring a welding interface with a rotating tool can create clean surfaces, and the clean surfaces can be brought into contact with each other, so that another advantage in that no pre-treatment step is necessary unlike diffusion bonding can also be expected. As described above, the use of the friction stir welding method for structural steel has many anticipated advantages. However, the use of the friction stir welding method for structural steel still has problems concerning welding workability, such as occurrence of defects in joints during welding and low welding speeds. The use of the friction stir welding method for structural steel thus has been less popular than the use of the friction stir welding method for low-melting-point metal materials. Examples of the above-mentioned defects in joints include shape failure and weld failure on joint surfaces or in joints especially immediately after welding.

Principal factors in the occurrence of defects in the friction stir welding method described in Patent Literature 2 include variations in temperature and plastic flow that occur in the thickness direction of the workpieces. Specifically, in the case where the rotating tool is disposed only on first surfaces of the metal plates, plastic flow that is sufficient to achieve a metallurgically favorable welded state can be obtained on the first surface side. However, the plastic flow on the second surface side is often insufficient because a temperature rise and a shear stress load are insufficient in an unwelded portion during welding.

When the friction stir welding method described in Patent Literature 2 is used for structural steel, sufficient plastic flow cannot be obtained in the unwelded portion in many cases at low heat input and high welding speed because the structural steel, which is a workpiece, has high strength at high temperature. It is thus difficult to increase the welding speed while suppressing occurrence of defects during welding.

As means for solving such problems, for example, Patent Literature 3 to Patent Literature 5 each disclose a double-sided friction stir welding method. In the double-sided friction stir welding method, two opposing rotating tools are pressed against a first surface and a second surface of a welded portion of metal plates (workpieces) to generate uniform and sufficient plastic flow in the thickness direction of the workpieces. As a result, the welding speed can be increased while occurrence of defects in a joint during welding is suppressed.

By the way, the process for producing steel strips requires continuously supplying steel strips in order to improve productivity and yield. To continuously supply steel strips, it is necessary to weld a preceding coil and a following coil together. In other words, a tailing end of a preceding material (preceding steel strip) is welded to a leading end of a following material (following steel strip), and the welded steel strips are continuously supplied to pickling, cold rolling, continuous annealing, and continuous coating lines in a common process. This process enables the steel strips to be rolled over its entire length under tension and allows precise control of the thickness and shape of the steel strips even at their leading ends and tailing ends.

With a high degree of alloying of cold-rolled steel strips and advanced laser welders, laser welding is becoming a mainstream method for welding the preceding material to the following material instead of flash butt welding or other methods in the related art. However, laser welding is fusion welding and may have problems of brittleness resulting from segregation of impurities during melting and solidification, and embrittlement resulting from hydrogen intrusion. To solve these problems, the use of the friction stir welding method which is solid-state welding is considered effective. As described above, however, it is difficult to increase the welding speed while suppressing occurrence of defects in common friction stir welding, and thus common friction stir welding cannot satisfy productivity required in the process for producing steel strips. As a means for solving such problems, for example, Patent Literature 4 discloses a cold rolling mill using double-sided friction stir welding.

In addition, the use of a friction stir welding method in welding cold-rolled steel strips requires the high durability and long life of a rotating tool. The reason for this is as follows: the rotating tool needs to be repaired due to damage and wear. However, if it is anticipated that weld failure will occur at high possibility due to this reason, it is determined to be practically difficult to use a friction stir welding method to weld cold-rolled steel strips together although there are advantageous effects described above.

A typical friction stir welding method uses a rotating tool having a protruding probe at its end and at the center of its rotation axis and a flatter shoulder portion around the probe and involves inserting the probe into an unwelded portion and rotating and translating the probe to weld workpieces together. Therefore, the probe receives a large load during welding and thus particularly easily breaks and wears among parts of the rotating tool.

Examples of techniques for avoiding breakage or other damage to probes include friction stir welding using a rotating tool having a planer end portion with no probe, as disclosed in Patent Literature 6 to Patent Literature 11.

CITATION LIST

Patent Literature

PTL 1: Japanese Unexamined Patent Application Publication No. 62-183979
PTL 2: Japanese Unexamined Patent Application Publication (Translation of PCT Application) No. 07-505090
PTL 3: Japanese Patent No. 3261433
PTL 4: Japanese Patent No. 4838385
PTL 5: Japanese Patent No. 4838388
PTL 6: Japanese Patent No. 5185103
PTL 7: Japanese Unexamined Patent Application Publication No. 2015-127063
PTL 8: Japanese Unexamined Patent Application Publication No. 2003-181655
PTL 9: Japanese Unexamined Patent Application Publication No. 2003-290936
PTL 10: Japanese Unexamined Patent Application Publication No. 2004-195480
PTL 11: Japanese Unexamined Patent Application Publication No. 2011-115846

SUMMARY

Technical Problem

However, the techniques disclosed in Patent Literature 6 and Patent Literature 7 aim at reinforcing a welded portion or hardening a metal surface and do not consider any application to welding of steel strips. Patent Literature 6 and Patent Literature 7 each describe the end portion of a rotating tool having a flat surface or a planar surface, but do not describe the end portion of the rotating tool having a concave or convex curved shape for the purpose of improving plastic flow. There is also no description of the rotating tools of the related art in Patent Literature 6 and Patent Literature 7 having a spiral stepped portion extending in a direction opposite to the rotation direction. Thus, the use of the above rotating tools of the related art to weld steel strips together may lead to insufficient plastic flow in the thickness direction to cause weld failure.

The techniques disclosed in Patent Literature 8 to Patent Literature 11 aim at welding metal plates by a friction stir welding method and do not consider any application to a double-sided friction stir welding method. In other words, Patent Literature 8 to Patent Literature 11 do not disclose an appropriate relationship between the diameter of an end portion of a rotating tool and the thickness of metal plates which are to be welded together in the double-sided friction stir welding method. The techniques disclosed in Patent Literature 8 to Patent Literature 11 may thus fail to provide a non-defective welded portion.

The disclosed embodiments have been completed in view of the above problems, and it is an object of the disclosed embodiments to provide a double-sided friction stir welding method, methods for producing a cold-rolled steel strip and a coated steel strip, a double-sided friction stir welding apparatus, and facilities for producing a cold-rolled steel strip and a coated steel strip, in which the welding speed with a rotating tool can be increased and the durability of the rotating tool can be improved while occurrence of defects in a welded portion can be suppressed.

Solution to Problem

The gist of the disclosed embodiments is as described below.

[1] A double-sided friction stir welding method which includes:
in butt welding or lap welding between a tailing end of a preceding steel strip and a leading end of a following steel strip,
pressing two rotating tools, which are disposed on a first surface and a second surface of a butt portion or overlap portion of the steel strips, against the butt portion or overlap portion of the steel strips and moving the rotating tools in a welding direction while rotating the rotating tools in opposite directions to each other, so that an unwelded portion of the steel strips is softened by frictional heat generated between the rotating tools and the unwelded portion of the steel strips, and the softened portion is stirred with the rotating tools to generate plastic flow so as to weld the steel strips together, wherein:

the two rotating tools each have an end portion formed to have a shape of one of a circular planar surface, a circular convex curved surface, and a circular concave curved surface; and the end portions are each made of a material harder than the steel strips.

[2] In the double-sided friction stir welding method according to [1], the end portions each have a spiral stepped portion extending in a direction opposite to a rotation direction.

[3] In the double-sided friction stir welding method according to [1] or [2], an inclination angle α (°) at which rotation axes of the two rotating tools are inclined backward in the welding direction with respect to a normal to a surface of the unwelded portion of the steel strips, a diameter D (mm) of each end portion, and a distance G (mm) between the end portions of the two rotating tools satisfy formula (1) and formula (2) below:

$$0 \le \alpha \le 3 \tag{1}$$

$$0.25 \times t - 0.2 \times D \times \sin\alpha \le G \le 0.8 \times t - 0.2 \times D \times \sin\alpha \tag{2}$$

where t represents a thickness (mm) of each steel strip for butt welding of the steel strips, or a total thickness (mm) of the overlapped steel strips for lap welding of the steel strips.

[4] In the double-sided friction stir welding method according to any one of [1] to [3], the diameter D (mm) of each end portion satisfies formula (3):

$$4 \times t \le D \le 20 \times t \tag{3}$$

where t represents a thickness (mm) of each steel strip for butt welding of the steel strips, or a total thickness (mm) of the overlapped steel strips for lap welding of the steel strips.

[5] In the double-sided friction stir welding method according to any one of [1] to [4], when a height of the convex curved surface of each end portion is denoted by dv (mm), a diameter D (mm) of each end portion and the height dv of the convex curved surface satisfy formula (4):

$$dv/D \le 0.06 \tag{4}$$

[6] In the double-sided friction stir welding method according to any one of [1] to [4], when a depth of the concave curved surface of each end portion is denoted by dc (mm), the diameter D (mm) of each end portion and the depth dc of the concave curved surface satisfy formula (5):

$$dc/D \le 0.03 \tag{5}$$

[7] A method for producing a cold-rolled steel strip which includes: after welding between a tailing end of a preceding steel strip and a leading end of a following steel strip using the double-sided friction stir welding method according to any one of [1] to [6], performing cold rolling or performing cold rolling after pickling.

[8] The method for producing a cold-rolled steel strip according to [7] which further includes performing annealing after the cold rolling.

[9] A method for producing a coated steel strip which includes: after welding between a tailing end of a preceding steel strip and a leading end of a following steel strip using the double-sided friction stir welding method according to any one of [1] to [6], performing cold rolling or performing cold rolling after pickling, and then performing annealing and coating.

[10] A double-sided friction stir welding apparatus which includes two rotating tools that oppose each other across an unwelded portion of two steel strips, and a controlling device that controls operation of the two rotating tools, in which:

the double-sided friction stir welding apparatus welds the steel strips together as the two rotating tools move in a welding direction while pressing the unwelded portion of the butting or overlapped steel strips and rotating in opposite directions to each other;

the two rotating tools each have an end portion formed to have a shape of one of a circular planar surface, a circular convex curved surface, and a circular concave curved surface; and the end portions are each made of a material harder than the steel strips.

[11]

In the double-sided friction stir welding apparatus according to [10], the end portions each have a spiral stepped portion extending in a direction opposite to a rotation direction.

[12]

In the double-sided friction stir welding apparatus according to [10] or [11], the controlling device performs control in such a manner that an inclination angle α (°) at which rotation axes of the two rotating tools are inclined backward in the welding direction with respect to a normal to a surface of the unwelded portion of the steel strips, a diameter D (mm) of each end portion, and a distance G (mm) between the end portions of the two rotating tools satisfy formula (1) and formula (2) below:

$$0 \le \alpha \le 3 \tag{1}$$

$$0.25 \times t - 0.2 \times D \times \sin\alpha \le G \le 0.8 \times t - 0.2 \times D \times \sin\alpha \tag{2}$$

where t represents a thickness (mm) of each steel strip for butt welding of the steel strips, or a total thickness (mm) of the overlapped steel strips for lap welding of the steel strips.

[13] In the double-sided friction stir welding apparatus according to any one of (10) to [12], the diameter D (mm) of each end portion satisfies formula (3):

$$4 \times t \le D \le 20 \times t \qquad \text{Formula (3)}$$

where t represents a thickness (mm) of each steel strip for butt welding of the steel strips, or a total thickness (mm) of the overlapped steel strips for lap welding of the steel strips.

[14] In the double-sided friction stir welding apparatus according to any one of (10) to (13), when a height of the convex curved surface of each end portion is denoted by dv (mm), a diameter D (mm) of each end portion and the height dv of the convex curved surface satisfy formula (4):

$$dv/D \le 0.06 \tag{4}$$

[15] In the double-sided friction stir welding apparatus according to any one of [10] to [13], when a depth of the concave curved surface of each end portion is denoted by dc (mm), the diameter D (mm) of each end portion and the depth dc of the concave curved surface satisfy formula (5):

$$dc/D \le 0.03 \tag{5}$$

[16] A facility for producing a cold-rolled steel strip which includes: in addition to the double-sided friction stir welding apparatus according to any one of [10] to [15], a cold rolling unit that cold-rolls the welded steel strips, or a cold rolling unit that cold-rolls the welded steel strips after pickling in a pickling unit.

[17] The facility for producing a cold-rolled steel strip according to [16] which further includes an annealing unit that anneals the cold-rolled steel strips.

[18] A facility for producing a coated steel strip which includes: in addition to the double-sided friction stir welding apparatus according to any one of [10] to [15], a cold rolling unit that cold-rolls the welded steel strips, or a cold rolling unit that cold-rolls the welded steel strips after pickling in a pickling unit; an annealing unit that anneals the cold-rolled steel strips; and a coating unit that coats the annealed steel strips.

Advantageous Effects

According to the disclosed embodiments, brittleness resulting from segregation of impurities during melting and solidification and embrittlement resulting from hydrogen intrusion, which have been problems in fusion welding of the related art, can be avoided, and the welding speed can be increased while occurrence of defects is suppressed. According to the disclosed embodiments, uniform plastic flow promoted in the thickness direction of steel strips suppresses occurrence of defects even in double-sided friction stir welding at a high welding speed to provide a welded portion having sufficient strength. According to the disclosed embodiments, it is possible to eliminate a probe that preferentially breaks and wears as a result of receiving a stress greater than the stress on a shoulder portion in a rotating tool of the related art, which improves the durability of the rotating tools for double-sided friction stir welding.

BRIEF DESCRIPTION OF THE DRAWINGS

FIG. 3(a) and FIG. 3(b) are diagrams illustrating a region that is friction-stirred with rotating tools, where FIG. 3(a) and FIG. 3(b) are respectively a plan view and a sectional view taken along line A-A□ of FIG. 3(a).

FIG. 8(a) to FIG. 8(c) each illustrate the shapes of stepped portions of the rotating tool according to disclosed embodiments, where FIG. 8(a) is a plan view, and FIG. 8(b) and FIG. 8(c) are sectional views taken along line B-B□ of FIG. 8(a).

FIG. 9 includes diagrams illustrating an example of how to draw spirals forming the stepped portions according to the disclosed embodiments.

FIG. 11 includes diagrams illustrating an example of how to draw spirals forming the stepped portions according to the disclosed embodiments.

FIG. 13 includes diagrams illustrating an example of how to draw spirals forming the stepped portions according to the disclosed embodiments.

DETAILED DESCRIPTION

The disclosed embodiments will be described below with reference to the drawings. The disclosure is not intended to be limited to the following specific embodiments.

Figure 1:
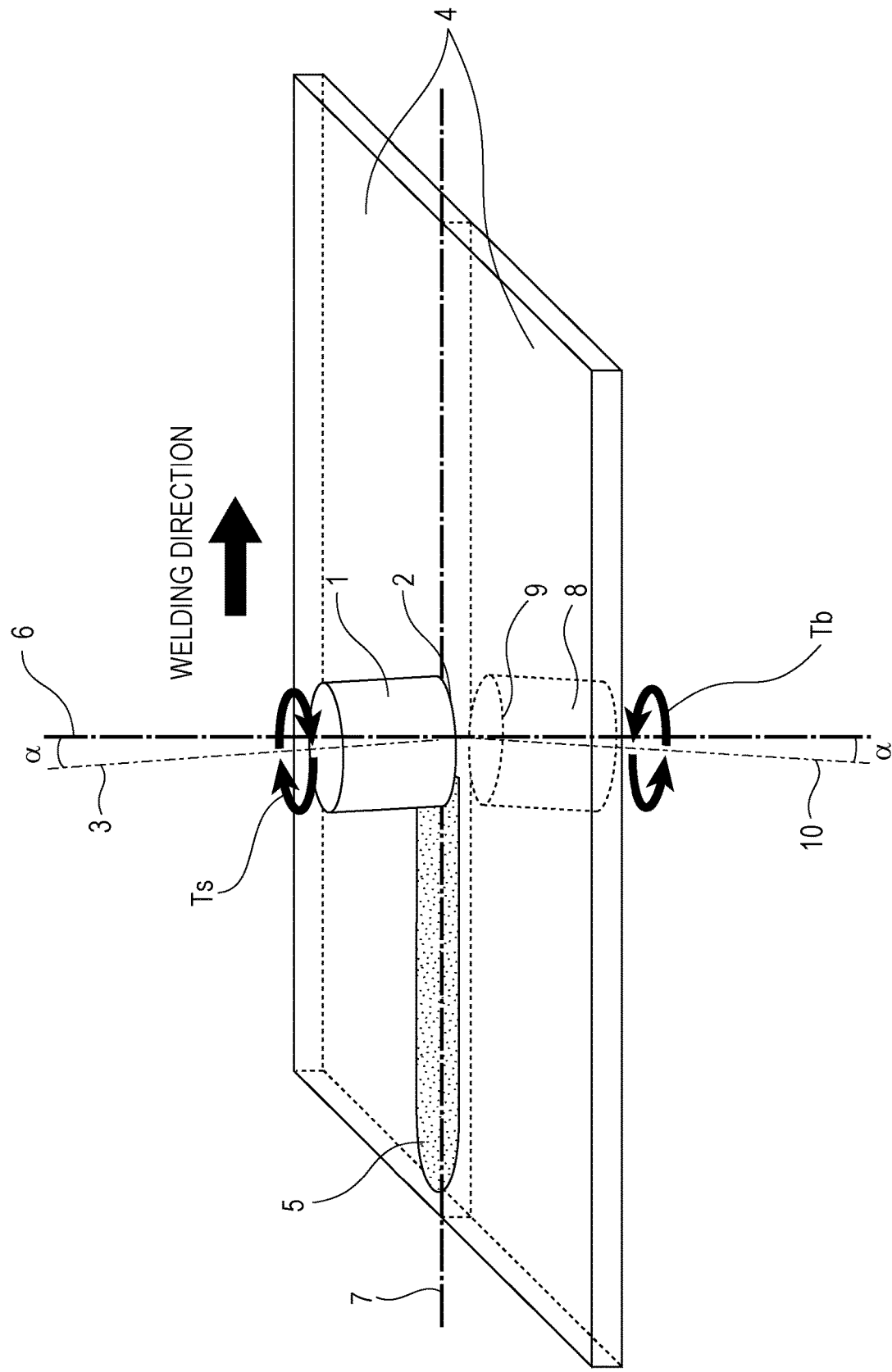
FIG. 1 is a schematic diagram illustrating a double-sided friction stir welding method according to the disclosed embodiments, which is an example of butt welding.
Figure 2:
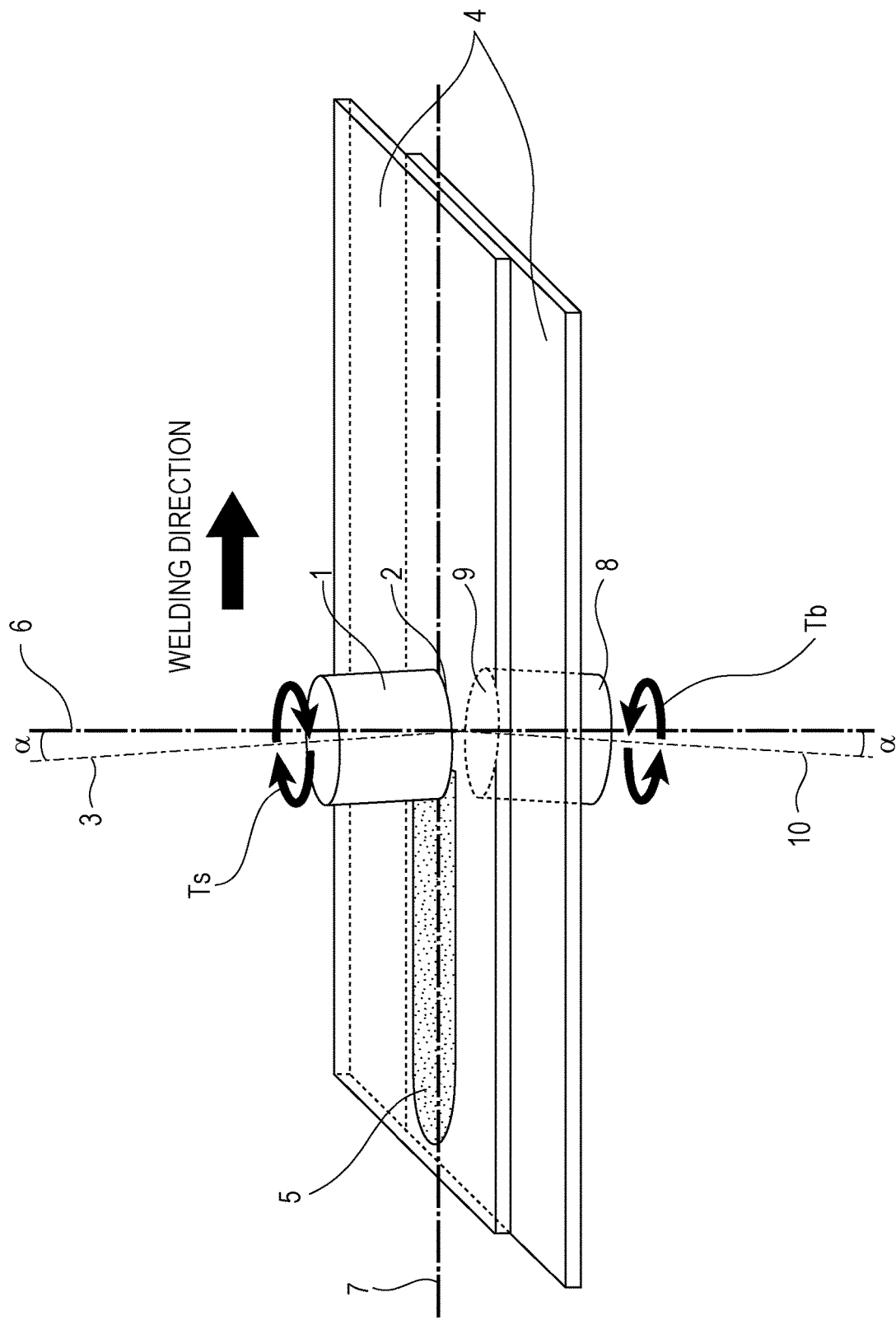
FIG. 2 is a schematic diagram illustrating a double-sided friction stir welding method according to the disclosed embodiments, which is an example of lap welding.

First, a double-sided friction stir welding method and a double-sided friction stir welding apparatus according to the disclosed embodiments will be described. FIG. 1 illustrates an example of butt welding using a double-sided friction stir welding method. FIG. 2 illustrates an example of lap welding using a double-sided friction stir welding method.

A double-sided friction stir welding method according to the disclosed embodiments includes, in butt welding or lap welding between the tailing end of a preceding steel strip and the leading end of a following steel strip, pressing two rotating tools, which are disposed on a first surface and a second surface of a butt portion or overlap portion of the steel strips, against the butt portion or overlap portion of the steel strips and moving the rotating tools in the welding direction while rotating the rotating tools in opposite directions to each other. Then, an unwelded portion of the steel strips is softened by frictional heat generated between the rotating tools and the unwelded portion of the steel strips, and the softened portion is stirred with the rotating tools to generate plastic flow, whereby the steel strips are welded together.

As illustrated in FIG. 1 and FIG. 2, the double-sided friction stir welding method according to the disclosed embodiments uses a double-sided friction stir welding apparatus including two rotating tools 1 and 8, a holding device (not illustrated), and a controlling device (not illustrated) that controls the operation of the rotating tools 1 and 8. In the examples illustrated in FIG. 1 and FIG. 2, one of two steel strips 4 is the preceding steel strip located at the front in the traveling direction (not illustrated), and the other steel strip 4 is the following steel strip located at the rear in the traveling direction.

The controlling device controls, for example, the inclination angle α of each of the rotating tools 1 and 8, the distance G between an end portion of the rotating tool 1 and an end portion of the rotating tool. 8, the welding speed, the rotational speed and rotation direction of each of the rotating tools 1 and 8, as described below.

The rotating tools 1 and 8 (the rotating tool that is disposed on the front surfaces of steel strips may hereinafter be referred to as a front-surface-side rotating tool 1, and the rotating tool that is disposed on the rear surfaces of the steel strips may hereinafter be referred to as a rear-surface-side rotating tool 8) are respectively disposed on first surfaces (front surfaces) and second surfaces (rear surfaces) of the steel strips (workpieces, or to-be-welded members) 4. The two steel strips 4 are arranged parallel to a joint center line 7 illustrated in FIG. 1 and FIG. 2 and are each held by a holding device (not illustrated). On an unwelded portion of the two steel strips 4 that is located on the joint center line 7, the rotating tools 1 and 8 move in the welding direction (the direction indicated by an arrow in the figures) while rotating and pressing the steel strips 4. The steel strips 4 are thus softened by frictional heat generated between the rotating tools 1 and 8 and the steel strips 4, and the softened portion is stirred with the rotating tools 1 and 8 to generate plastic flow, whereby the steel strips 4 are welded together. In the following description, a portion in which welding is complete will be referred to as a welded portion 5.

As illustrated in FIG. 1 and FIG. 2, the rotating tool 1 on the front surface and the rotating tool 8 on the rear surface, which oppose each other, rotate in opposite directions to each other as being viewed from the front surface (or the rear surface) of the steel strips 4. This enables a rotation torque applied by the rotating tool 1 to the steel strips 4 and a rotation torque applied by the rotating tool 8 to the steel strips 4 to cancel each other out. As a result, the structure of a jig that restrains to-be-welded members can be further simplified compared with a friction stir welding method of the related art in which an unwelded portion is pressed and welded by using only one rotating tool disposed on one surface. In the examples illustrated in FIG. 1 and FIG. 2, the rotation direction of the front-surface-side rotating tool 1 is indicated by arrow Ts, and the rotation direction of the rear-surface-side rotating tool 8 is indicated by arrow Tb.

If the rotating tool 1 on the front surface and the rotating tool 8 on the rear surface, which oppose each other, rotate in the same direction, the speed of one of the rotating tools relative to the other rotating tool approaches zero. As a result, as the plastic flow of the steel strips 4 becomes more uniform, the plastic deformation decreases, and the plastic deformation of the material generates less heat, which makes it difficult to achieve a favorable welded state. In order to provide a uniform temperature rise and a uniform shear stress in the thickness direction of the steel strips sufficient to achieve a favorable welded state, it is effective to set the rotation directions of the rotating tool 1 on the front surface (first surface) and the rotating tool 8 on the rear surface (second surface), which oppose each other, to be opposite to each other.

The type of welding of steel strips will now be described. Preferred examples of the type of welding of steel strips include butt welding and lap welding. As illustrated in FIG. 1, butt welding refers to welding of steel strips involving pressing the rotating tools 1 and 8 against a butt portion including the end surfaces (abutting surfaces) of two opposing steel strips 4 placed end to end without overlapping, and moving the rotating tools 1 and 8 in the welding direction while rotating the rotating tools 1 and 8. As illustrated in FIG. 2, lap welding refers to welding of steel strips involving pressing the rotating tools 1 and 8 against an overlap portion of two steel strips 4 with end portions of the steel strips 4 at least partially overlapping each other, and moving the rotating tools 1 and 8 in the welding direction while rotating the rotating tools 1 and 8. Since FIG. 1 and FIG. 2 are different from each other only in the type of welding and are the same in terms of the configurations of devices and so forth, an example of butt welding illustrated in FIG. 1 will be mainly described below.

Figure 4:
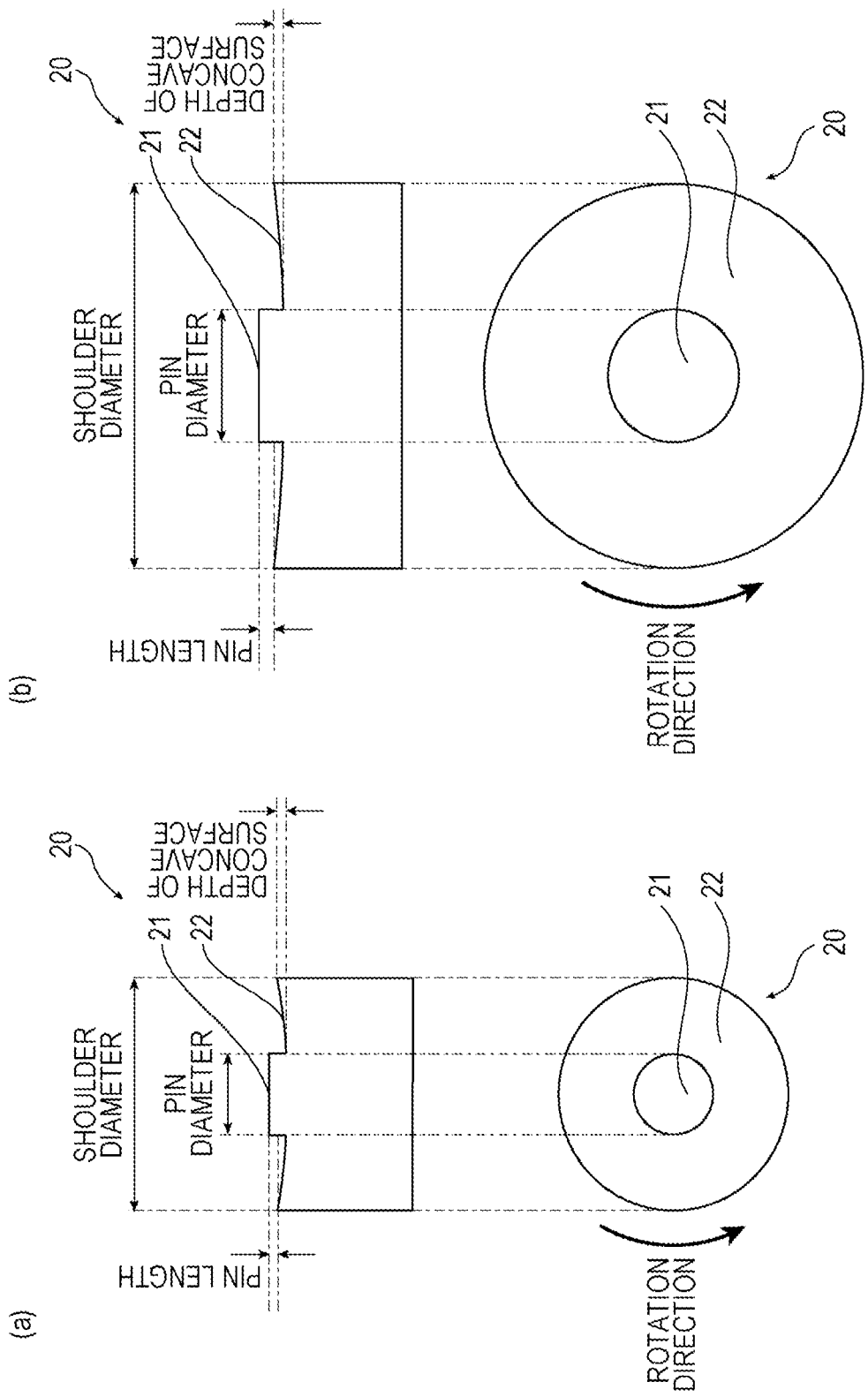
FIG. 4(a) and FIG. 4(b) each illustrate the shape of a rotating tool of the related art and each include a side view at the top and a plan view at the bottom.
Figure 5:
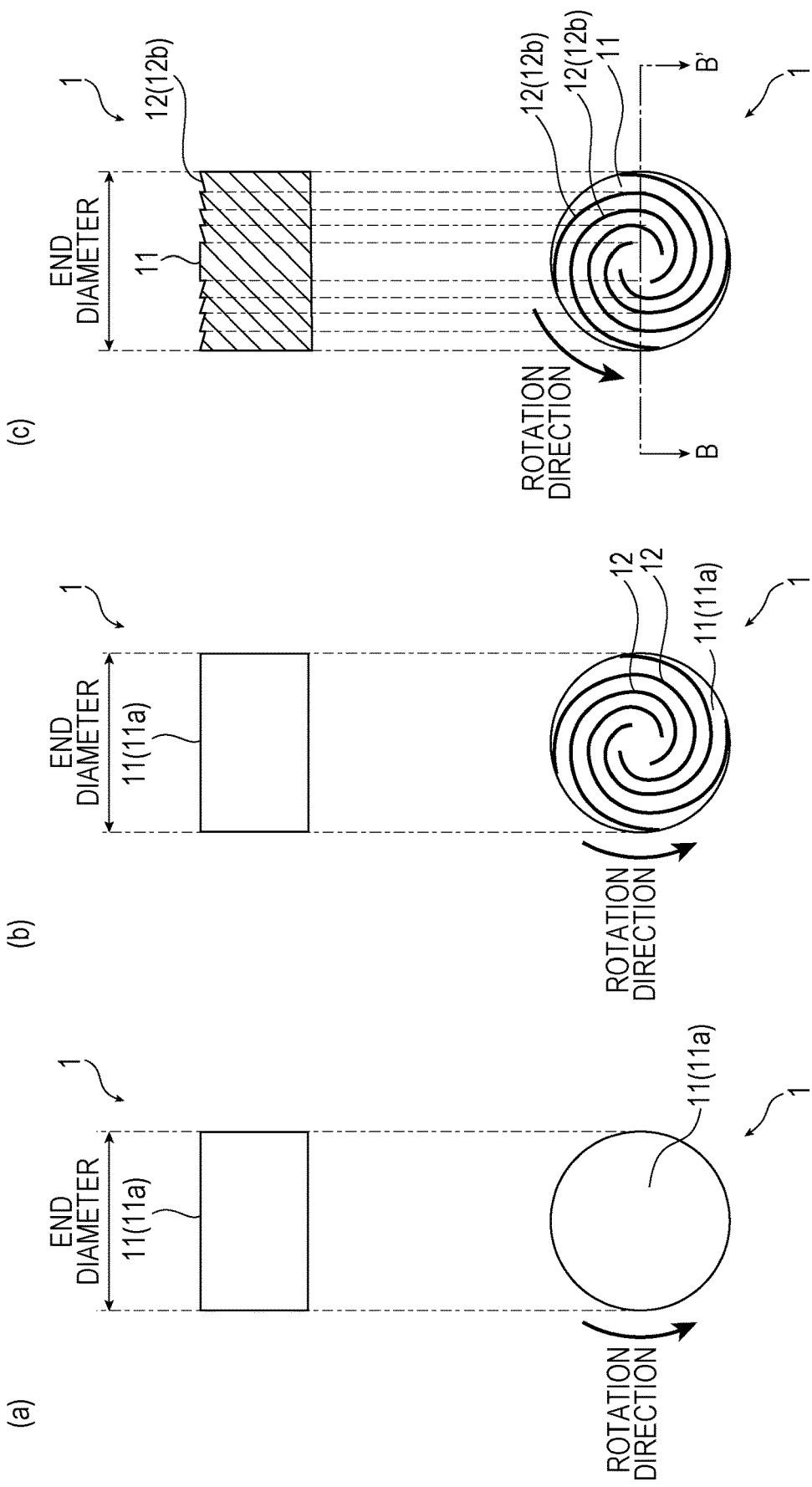
FIG. 5(a) to FIG. 5(c) each illustrate the shape of a rotating tool according to a first embodiment and each include a side view at the top and a plan view at the bottom.
Figure 6:
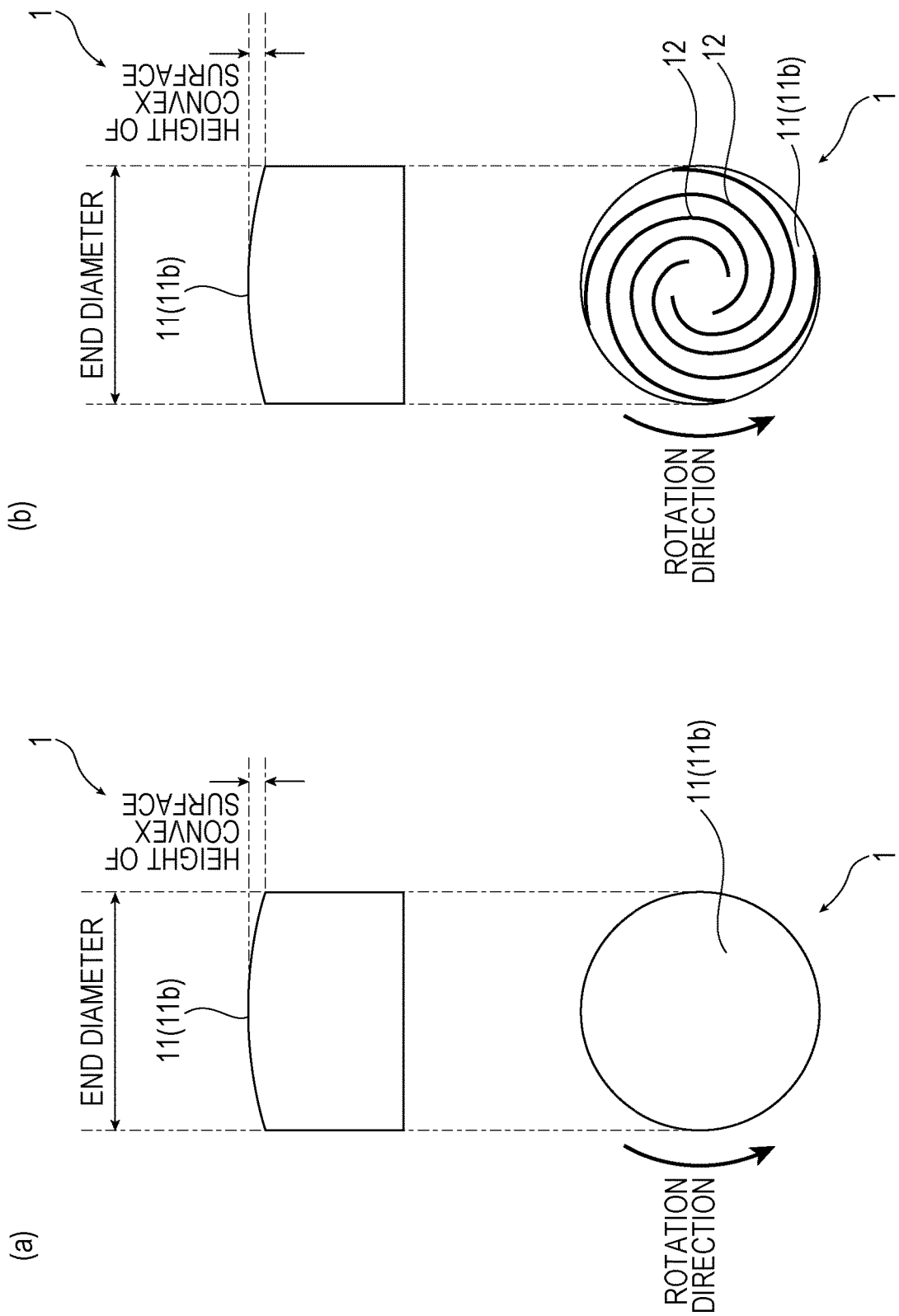
FIG. 6(a) and FIG. 6(b) each illustrate the shape of a rotating tool according to a second embodiment and each include a side view at the top and a plan view at the bottom.
Figure 7:
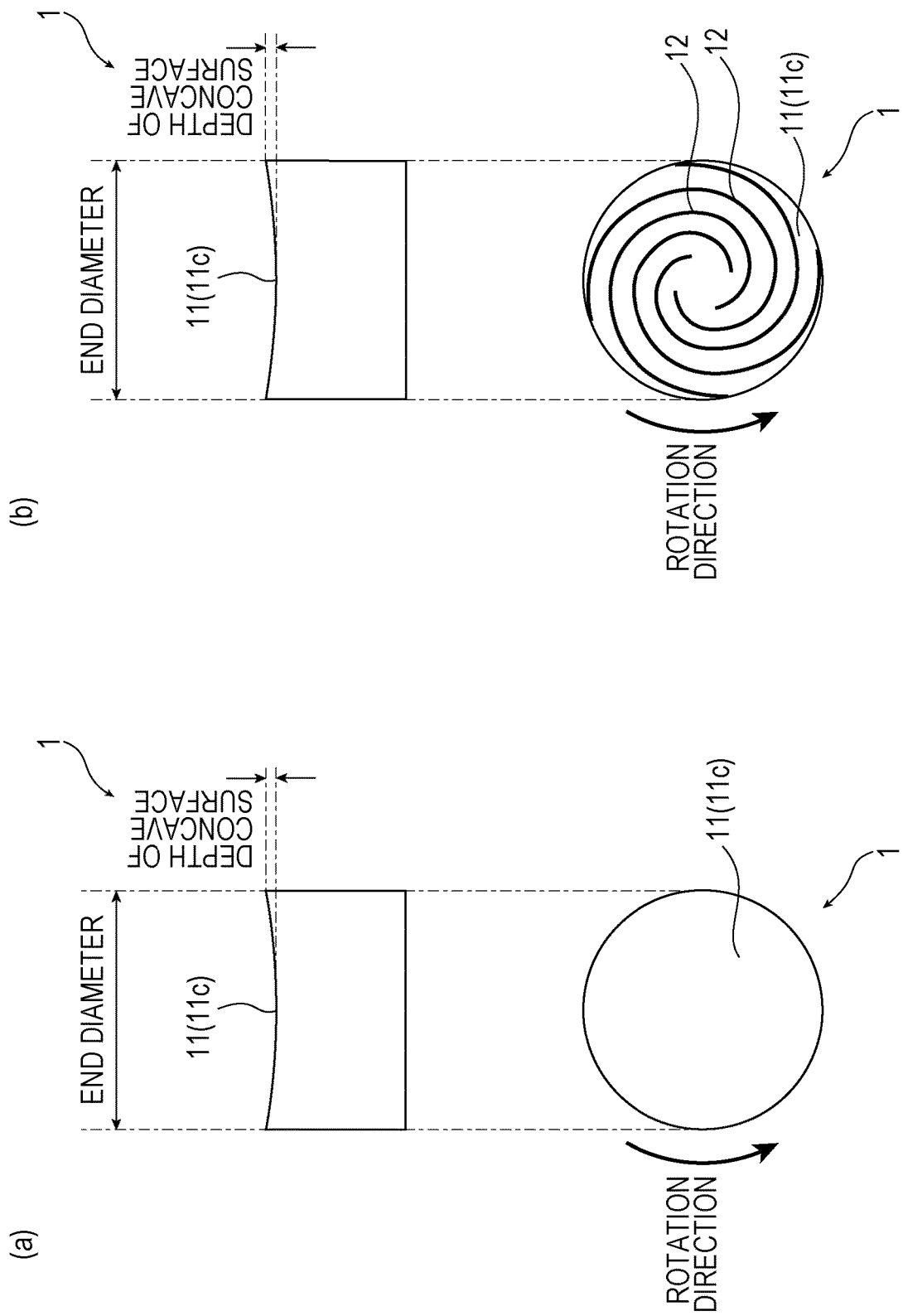
FIG. 7(a) and FIG. 7(b) each illustrate the shape of a rotating tool according to a third embodiment and each include a side view at the top and a plan view at the bottom.
Figure 10:
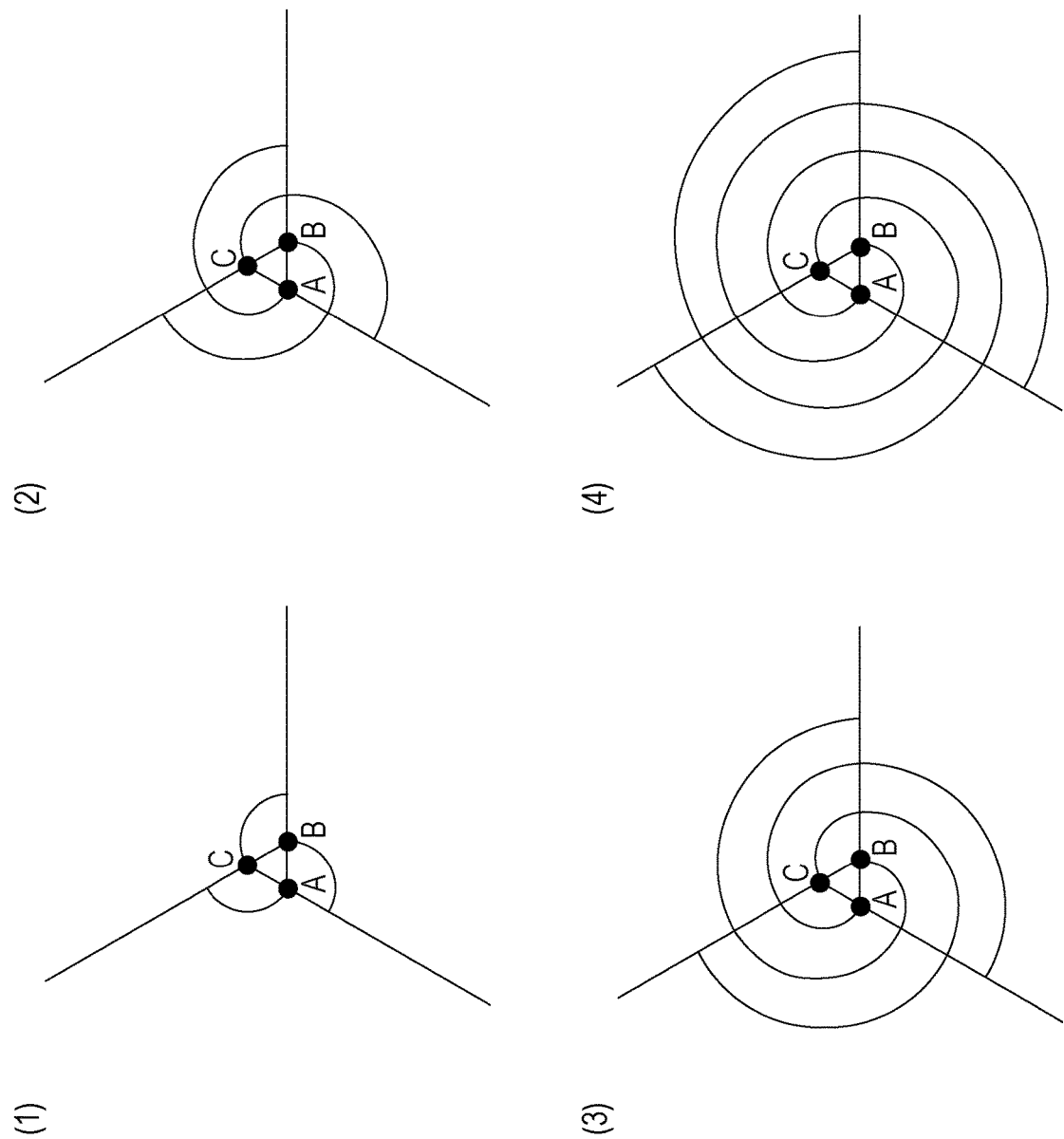
FIG. 10 includes diagrams illustrating an example of how to draw spirals forming the stepped portions according to the disclosed embodiments.
Figure 12:
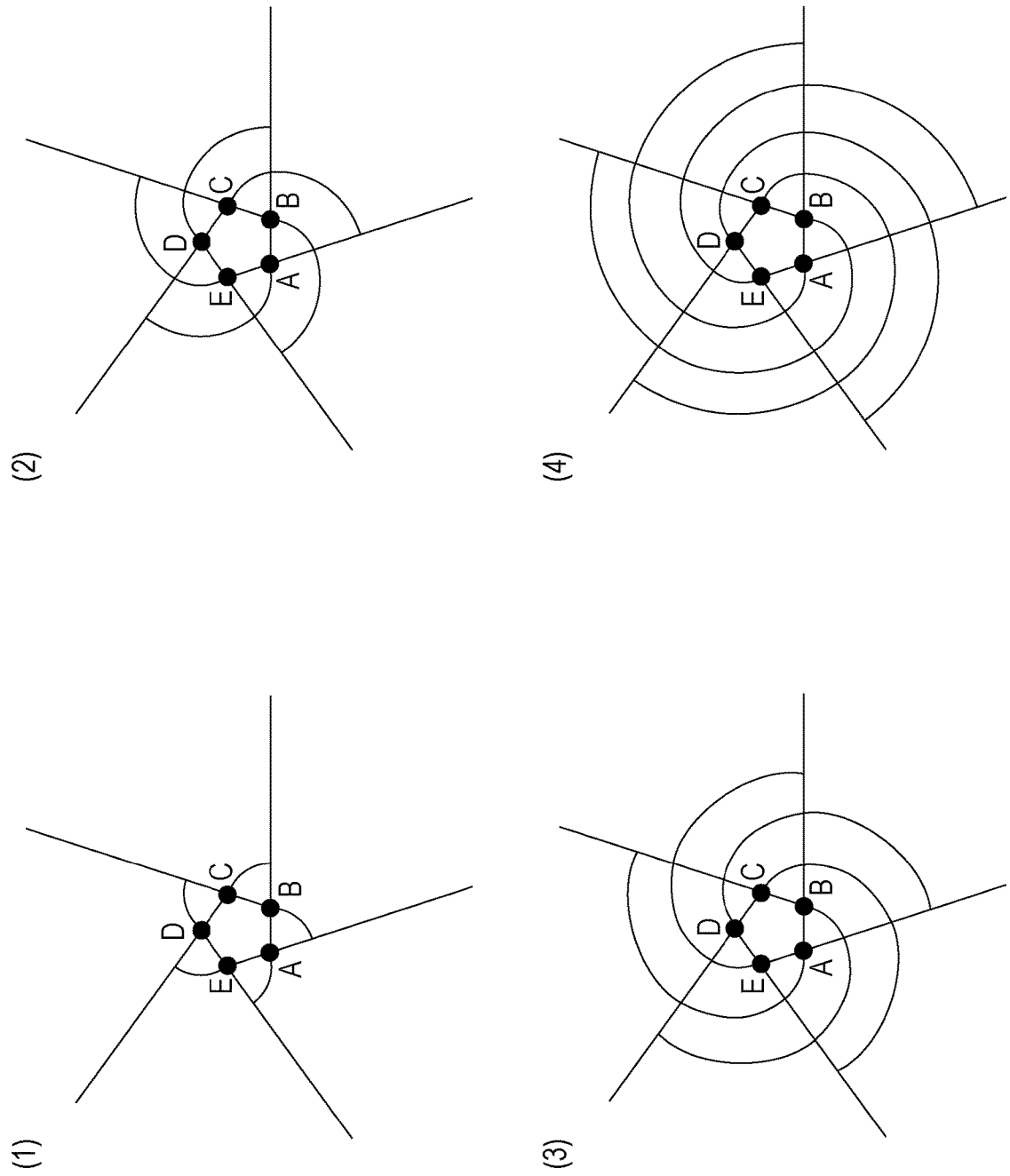
FIG. 12 includes diagrams illustrating an example of how to draw spirals forming the stepped portions according to the disclosed embodiments.

The rotating tools used in double-sided friction stir welding of the disclosed embodiments will next be described. FIG. 4(a) and FIG. 4(b) are diagrams illustrating a rotating tool 20 of the related art including a probe. FIG. 5(a) to FIG. 8(c) are diagrams illustrating the rotating tools 1 and 8 of the disclosed embodiments. FIG. 5(a) to FIG. 5(c) each illustrate a rotating tool according to a first embodiment. FIG. 6(a) and FIG. 6(b) each illustrate a rotating tool according to a second embodiment. FIG. 7(a) and FIG. 7(b) each illustrate a rotating tool according to a third embodiment. FIG. 8(a) to FIG. 8(c) each illustrate an example of the rotating tool according to the second embodiment that has stepped portions at its end portion. FIG. 4(a) to FIG. 7(b) each include a side view at the top and a plan view at the bottom. Since the front-surface-side rotating tool 1 and the rear-surface-side rotating tool 8 have the same shape, only the front-surface-side rotating tool 1 is illustrated in FIG. 4(a) to FIG. 8(c).

The rotating tool 20 including a probe (pin) 21, which is an example of the related art, will now be described with reference to FIG. 4(a) and FIG. 4(b). FIG. 4(a) and FIG. 4(b) each illustrate an example of the rotating tool. 20 that includes the probe 21 on a shoulder portion 22. For example, in the example of the rotating tool 20 illustrated in FIG. 4(a), the rotating tool 20 is shaped as follows: the diameter of the shoulder portion 22 (shoulder diameter) is 12 mm, the diameter of the probe 21 (pin diameter) is 4 mm, the length of the probe 21 (pin length) is 0.5 mm, and the depth of a concave surface is 0.3 mm. In the example of the rotating tool 20 illustrated in FIG. 4(b), the rotating tool 20 is shaped as follows: the shoulder diameter is 20 mm, the pin diameter is 6.7 mm, the pin length is 0.7 mm, and the depth of a concave surface is 0.3 mm.

As illustrated in FIG. 4(a) and FIG. 4(b), an end portion of the rotating tool 20 of the related art, that is, a portion of the rotating tool 20 that comes into contact with a softened portion of steel strips during welding, includes the shoulder portion 22 (the area indicated by the shoulder diameter in FIG. 4(a) and FIG. 4(b)) and the probe 21 (the area indicated by the pin diameter in FIG. 4(a) and FIG. 4(b)). The shoulder portion 22 has a flat shape formed of a substantially planar surface or a gently curved surface. The probe 21 is discontinuous with the shoulder portion 22 and protrudes substantially vertically toward the steel strips (not illustrated).

The probe 21 has a function of improving stirring performance in the vicinity of center portions of the steel strips in the thickness direction by entering the softened portion of the steel strips further toward the center in the thickness direction during welding. However, there is a problem in that a portion of the probe 21 that is positioned nearer to its end in the thickness direction (nearer to the center of the thickness) receives a stress greater than the stress received by the shoulder portion 22. Consequently, there is another problem in that the rotating tool needs to be repaired due to damage and wear as described above.

The inventors have carried out intensive studies. As a result, it has been found that a double-sided friction stir welding method using rotating tools for double-sided friction stir welding that are capable of suppressing occurrence of defects in a welded portion and increasing the welding speed without having a probe which particularly easily breaks and wears due to a greater stress applied thereto.

As illustrated in FIG. 5(a) to FIG. 7(c), an end of each of the rotating tools (the rotating tools 1 and 8 opposing each other) for double-sided friction stir welding of the disclosed embodiments is formed of simply an end portion 11. Unlike the configuration of the rotating tool of the related art, which is illustrated in FIG. 4(a) and FIG. 4(b), the end portion 11 of each of the rotating tools of the disclosed embodiments does not include the probe 21. The end portion 11 of each of the rotating tools 1 and 8 has one of a planar shape 11a (see FIG. 5(a) to FIG. 5(c)), a convex curved shape 11b (see FIG. 6(a) and FIG. 6(b)), and a concave curved shape 11c (see FIG. 7(a) and FIG. 7(b)). The end portions 11 each have a circular cross section in plan view.

The end portions 11 of the rotating tools 1 and 8 (an end portion 2 of the front-surface-side rotating tool and an end portion 9 of the rear-surface-side rotating tool, which are illustrated in FIG. 1 and other figures) are portions that come into contact with the steel strips 4 and the flowing portion (softened portion) of the steel strips 4 during welding. The end portions 11 of the rotating tools 1 and 8 are thus made of a material harder than the steel strips 4 in a high-temperature environment to which the end portions 11 are exposed during welding. The rotating tools 1 and 8 can thus deform the steel strips 4 during welding while the shapes of the end portions 11 are maintained. As a result, high stirring performance can be continuously achieved, and suitable welding can be performed.

For hardness comparison, test methods for Vickers hardness at elevated temperatures may be used. The rotating tools 1 and 8 may be formed such that only their end portions have the above-mentioned hardness or such that the entire rotating tools 1 and 8 have the above-mentioned hardness.

In addition to the above-described configuration, the end portion 11 of each of the rotating tools 1 and 8 preferably has spiral (helical) stepped portions 12 in the disclosed embodiments. Spirals (helixes) forming the stepped portion 12 of the rotating tool 1 preferably run in a direction opposite to the rotation direction of the rotating tool 1, and spirals (helixes) forming the stepped portion 12 of the rotating tool 8 preferably run in a direction opposite to the rotation direction of the rotating tool 8. The number of spirals forming the stepped portions 12 is preferably 1 or more.

In the case of one or more spirals, the curves (radial curves) are formed to extend radially from the center of the end portion 11 or the circumference of a circular blank region at the center to the outer circumference of the end portion 11.

If the number of spirals forming the stepped portions 12 is greater than 6, the effect of improving material flow decreases, and, in addition, the end portions 11 of the rotating tools 1 and 8 may easily break due to its complex shape. Thus, the number of spirals forming the stepped portions 12 is preferably 6 or less. In the examples illustrated in FIG. 5(b), FIG. 6(b), and FIG. 7(b) and the example illustrated in FIG. 8(a), the number of spirals is 4.

To prevent breakage of the end portions 11 of the rotating tools 1 and 8 while improving material flow, the number of spirals forming the stepped portions 12 can be adjusted according to the diameter of each of the end portions 11. Specifically, the number of spirals preferably increases as the diameter of each of the end portions 11 increases, and the number of spirals preferably decreases as the diameter of each of the end portions 11 decreases.

Specifically, the number of spirals is preferably 2 or less when the diameter of the end portion is smaller than 6 mm, and the number of spirals is preferably 3 to 6 when the diameter of the end portion is 6 mm or larger.

How to draw the spirals will, be described by using the examples illustrated in FIG. 9 to FIG. 13. FIG. 9 to FIG. 13 are the top views of the end portion and each illustrate the process for drawing spirals in the end portion.

In FIG. 9, the number of spirals is 2, and FIG. 9 illustrates an example of how to draw two spirals at regular intervals. As illustrated in FIG. 9, first, two semicircles (first semicircles) having a radius equal to the length of the line A-B are drawn from starting points at the point A and the point B (see (1)). Next, semicircles (second semicircles) having centers at the point A and the point B and each having a radius equal to twice the length of the line A-B are drawn outside the first semicircles (see (2)). Next, semicircles (third semicircles) having centers at the point A and the point B and each having a radius equal to three times the length of the line A-B are drawn outside the second semicircles (see (3)). Similarly, semicircles (fourth semicircles) each having a radius equal to four times the length of the line A-B are drawn (see (4)). By repeating this process, two spirals can be drawn at regular intervals in the end portion.

FIG. 10 to FIG. 13 each illustrate an example of how to draw spirals at regular intervals, where the number n of spirals is selected from $3 \leq n \leq 6$.

As illustrated in FIG. 10 to FIG. 13, first, regular n-sided polygons are drawn. A regular triangle is drawn in the example illustrated in FIG. 10, a square in the example illustrated in FIG. 11, a regular pentagon in the example illustrated in FIG. 12, and a regular hexagon in the example illustrated in FIG. 13. Arcs (first arcs) having centers at the vertices of each regular n-sided polygon and each having a radius equal to the length of one side of the regular n-sided polygon are drawn to the intersection points with the lines extending from the sides of the regular n-sided polygon (see (1)). Next, outside the first arcs, arcs (second arcs) having centers at the vertices of the regular n-sided polygon and each having a radius equal to twice the length of one side of the regular n-sided polygon are drawn to the intersection points with the lines extending from the sides of the regular n-sided polygon (see (2)). Next, outside the second arcs, arcs (third arcs) having centers at the vertices of the regular n-sided polygon and each having a radius equal to three times the length of one side of the regular n-sided polygon are drawn to the intersection points with the lines extending from the sides of the regular n-sided polygon (see (3)). Similarly, arcs (fourth arcs) each having a radius equal to four times the length of one side of the regular n-sided polygon are drawn (see (4)). By repeating this process, n ($3 \leq n \leq 6$) spirals can be drawn at regular intervals in the end portion.

In the case where the number of spirals is 1, the spiral may be drawn by any one of the methods illustrated in FIG. 9 to FIG. 13. In the case where the number of spirals is 2 and two spirals are drawn at regular intervals, the spirals can also be drawn by the method illustrated in FIG. 11 or FIG. 13 in addition to the method illustrated in FIG. 9. In the case where the number of spirals is 3 and three spirals are drawn at regular intervals, the spirals can also be drawn by the method illustrated in FIG. 13 in addition to the method illustrated in FIG. 10. In these cases, the number of spirals (the number of lines) is adjusted by appropriately selecting the starting points illustrated in FIG. 9 or the vertices of the regular n-sided polygons illustrated in FIG. 10 to FIG. 13 according to the number of spirals.

The stepped portions 12 are each recessed from the other surface (planar surface or curved surface) of the corresponding end portion. Such recessed stepped portions 12 cause a metal material softened by frictional heat to flow from the outside toward the inside of the rotating tools 1 and 8 when the rotating tools 1 and 8 press and stir the steel strips 4. The rotating tools 1 and 8 can accordingly prevent the metal material from flowing out of the pressed portion. This can promote plastic flow of the pressed portion and can also prevent a welded portion from having a smaller thickness than a base material, forming a smooth and burr-free surface of the welded portion. The above advantageous effects of the stepped portions are obtained by forming the spiral stepped portions 12 such that the stepped portions 12 extend in the direction opposite to the rotation direction of the rotating tools 1 and 8. The rotating tools according to the disclosed embodiments preferably have no spiral stepped portion at the center of its end portion, or preferably have, at the center of its end portion, no spiral stepped portion extending in the direction opposite to the rotation direction.

The advantageous effects similar to those described above can be obtained by providing one or more spiral stepped portions 12 extending in the direction opposite to the rotation direction of the corresponding rotating tool.

The stepped portions 12 will now be described more specifically with reference to FIG. 8(*a*) to FIG. 8(*c*). FIG. 8(*a*) is a plan view of the rotating tool 1 (front-surface-side rotating tool) that includes the end portion 11 having the convex curved shape 11*b*, and FIG. 8(*b*) and FIG. 8(*c*) are sectional views taken along line B-BO of FIG. 8(*a*).

As illustrated in FIG. 8(*a*), the stepped portions 12 extend in the direction opposite to the rotation direction in plan view. In other words, the direction of the curve of each of the stepped portions 12 extending from the circumference of the circle toward the center of the circle is opposite to the rotation direction of the rotating tool.

As illustrated in FIG. 8(*a*), each of the spiral stepped portions 12 forms a curve extending from a starting point in the vicinity of the center of the circle toward the circumference of the circle in plan view. The length of each spiral is preferably 0.5 turns or more and 2 turns or less when the length of the outer circumference of the end portion 11 is one turn. The length of each spiral can also be adjusted according to the diameter of the end portion 11. The length of each spiral preferably increases as the diameter of the end portion 11 increases. The length of each spiral preferably decreases as the diameter of the end portion 11 decreases.

Specific examples of the stepped portions 12 include step portions 12*b* illustrated in FIG. 8(*b*) and groove portions 12*c* illustrated in FIG. 8(*c*). In the example illustrated in FIG. 8(*b*), the step portions 12*b* form substantially horizontal steps such that the heights of the steps gradually increase from the circumference of the circle toward the center of the circle, as on the convex curved surface of the end portion 11 of the rotating tool 1. To obtain the above-described advantageous effects, one or more spiral steps may be formed in the disclosed embodiments. In the example illustrated in FIG. 8(*b*), the formed stepped portions 12 each have a spiral shape in plan view as illustrated in FIG. 8(*a*).

Although not illustrated, when the rotating tool having an end portion with a concave curved shape includes the step portions 12*b* on the concave curved surface, steps may be formed such that the heights of the steps gradually decrease from the circumference of the circle toward the center of the circle according to the concave curved surface.

In the example illustrated in FIG. 8(*c*), the groove portions 12*c* on the curved surface (convex curved surface) of the end portion 11 of the rotating tool 1 each have a groove with a substantially U-shaped cross section so as to be recessed from the other surface. To obtain the above-described advantageous effects, one or more groove portions 12*c* may be formed in the disclosed embodiments. In the example illustrated in FIG. 8(*c*), the formed groove portions 12*c* each have a long and narrow shape extending in a spiral manner in plan view as illustrated in FIG. 8(*a*). The above-described advantageous effects are obtained with, for example, a V-shape or a check mark shape instead of the U-shape.

Although not illustrated, when the rotating tool 1 having the end portion 11 with the concave curved shape 11*c* or the planar shape 11*a* includes the groove portions 12*c* on the concave curved surface or the planar surface, grooves having a substantially U-shaped cross section may be formed similarly.

In addition to the above-described configuration, the diameter D (mm) of the end portion 11 of each of the rotating tools 1 and 8 preferably satisfies the relationship represented by the following formula (3) in the disclosed embodiments:

$$4 \times t \leq D \leq 20 \times t \qquad \text{Formula (3)}$$

where t represents the thickness (mm) of each steel strip for butt welding of steel strips, or the total thickness (mm) of steel strips for lap welding of steel strips.

With the diameter of each end portion 11 controlled, the rotating tools 1 and 8 can provide a temperature rise and a shear stress uniformly and effectively in the thickness direction of the steel strips 4. The diameter D of the end portion 11 of the rotating tool 1 is preferably controlled according to the thickness of each of the steel strips 4 (the total thickness t of the steel strips 4 for lap welding). In other words, it is effective to set the diameter D (mm) of the end portion 11 of each of the rotating tools 1 and 8 in accordance with the formula (3):

$$4 \times t \leq D \leq 20 \times t.$$

If the diameter D (mm) is less than 4×t (mm), uniform plastic flow in the thickness direction may not be effectively obtained. If the diameter D (mm) is greater than 20×t (mm), a plastic flow region is unnecessarily widened, and an excessive load is applied to the apparatus, which is not preferable. The diameter D is preferably 5.5×t (mm) or greater and preferably 14×t (mm) or less.

As described above, the shape of the rotating tool according to the disclosed embodiments can be simplified by eliminating a probe required for a rotating tool of the related art. The rotating tool can have higher durability. The rotating tool can be produced with fewer steps and lower costs.

According to the double-sided friction stir welding method of the disclosed embodiments using the rotating tools, a sufficient temperature rise and a sufficient shear stress during welding can be uniformly provided in the thickness direction. In other words, a uniform temperature rise in the thickness direction can be more effectively achieved by promoting plastic flow by a welding method using the rotating tools of the disclosed embodiments having the above configuration compared with a uniform temperature rise that can be obtained by double-sided friction stir welding of the related art. Thus, part of the welded portion is not exposed to an excessive temperature rise for completing welding of steel strips, which prevents liquation embrittlement caused by liquation of the segregation area due to exposure to high temperature, and hydrogen embrittlement caused by increased hydrogen intrusion into steel due to high temperature.

Next, the rotating tools according to the first to third embodiments will be described in detail below. It is noted that only the front-surface-side rotating tool 1 is illustrated in FIG. 5(*a*) to FIG. 7(*b*).

First Embodiment

As illustrated in FIG. 5(*a*) and FIG. 5(*c*), the rotating tools 1 and 8 according to the first embodiment each have a circular end formed of the end portion 11 having the planar shape 11*a*. The end portions 11 having a planar shape each have an end surface that comes into contact with steel strips and that is formed of a single planar surface perpendicular to the rotation axis of a corresponding one of the rotating tools 1 and 8. Unlike a rotating tool of the related art, the end surface does not have a probe protruding toward the steel strips. As illustrated in FIG. 5(*b*), the end portion 11 of each of the rotating tools 1 and 8 may have one or more spiral (helical) stepped portions 12 extending in the direction opposite to the rotation direction as described above. The stepped portions 12 have the step portions 12*b* or the groove portions 12*c* as described above.

The view at the top of FIG. 5(*c*) is a sectional view taken along line B-B☐ at the bottom of FIG. 5(*c*). The step portions 12*b* are formed by, for example, angling substantially horizontal faces as illustrated in FIG. 5(*c*). In other words, check mark-shaped groove portions are formed. The spirals of the step portions 12*b* in FIG. 5(*c*) can be drawn by, for example, the method in FIG. 10 described above.

Second Embodiment

As illustrated in FIG. 6(*a*) and FIG. 6(*b*), the rotating tools 1 and 8 according to the second embodiment each have a circular end formed of the end portion 11 having the convex curved shape 11*b*, and the end of each rotating tool is convexed. Although a rotating tool of the related art includes a probe that protrudes toward steel strips and that is discontinuous with a shoulder portion, the end portions 11 having a convex curved shape each have a continuous shape without a probe and form an approximately uniform inclined surface. In other words, the end portions 11 having a convex curved shape each have an end surface that comes into contact with steel strips and that is formed of a single curved surface (a parabolic surface, a prolate surface, or a spherical surface) protruding toward the center, and the end surface forms a curve having an approximately uniform curvature radius in a cross section including the rotation axis in the direction perpendicular to the steel strips. As illustrated in FIG. 6(*b*), the end portion 11 of each of the rotating tools 1 and 8 may have one or more spiral (helical) stepped portions 12 extending in the direction opposite to the rotation direction as described above. The stepped portions 12 have the step portions 12*b* or the groove portions 12*c* as described above.

In the case where the end of each of the rotating tools 1 and 8 is formed of the end portion 11 having the convex curved shape 11*b*, the rotating tools preferably satisfy the relationship represented by the following formula (4), where dv represents the height (mm) of the convex curved surface (convex surface), and D represents the diameter (mm) of the end portion of the rotating tool:

$$dv/D \leq 0.06 \qquad \text{Formula (4)}$$

When the end portions come into contact with the steel strips so as to satisfy the formula (4) (i.e., the value of dv/D is 0.06 or smaller), pressure can be effectively applied to the flowing portion. As a result, plastic flow sufficient for welding can be generated by the rotation of the rotating tools. If the ratio dv/D exceeds the range of the formula (4) (i.e., the value of dv/D exceeds 0.06), the front and rear surfaces of the welded portion become notably recessed, and the thickness of the welded portion becomes notably smaller than the thickness of each of the steel strips. It may be thus difficult to ensure the joint strength, which is not preferable. To effectively apply pressure to the flowing portion, the lower limit of the value of dv/D is preferably 0.01 or larger.

Third Embodiment

As illustrated in FIG. 7(*a*) and FIG. 7(*b*), the rotating tools 1 and 8 according to the third embodiment each have a circular end formed of the end portion 11 having the concave curved shape 11*c*, and the end of the rotating tool is concaved. Although a rotating tool of the related art includes a probe that protrudes toward steel strips and that is discontinuous with a shoulder portion, the end portions 11 having a concave curved shape each have a continuous shape without a probe and form an approximately uniform inclined surface. In other words, the end portions 11 having a concave curved shape each have an end surface that comes into contact with steel strips and that is formed of a single curved surface (a parabolic surface, a prolate surface, or a spherical surface) recessed toward the center, and the end surface forms a curve having an approximately uniform curvature radius in a cross section including the rotation axis in the direction perpendicular to the steel strips. As illustrated in FIG. 7(*b*), the end portion 11 of each of the rotating tools 1 and 8 may have one or more spiral (helical) stepped portions 12 extending in the direction opposite to the rotation direction as described above. The stepped portions 12 have the step portions 12*b* or the groove portions 12*c* as described above.

In the case where the end portion of the rotating tool is formed of the end portion 11 having the concave curved shape, the rotating tool preferably satisfies the relationship represented by the following formula (5), where dc represents the depth (mm) of the concave curved surface (concave surface), and D represents the diameter (mm) of the end portion of the rotating tool:

$$dc/D \leq 0.03 \qquad \text{Formula (5)}$$

When the end portions come into contact with the steel strips so as to satisfy the formula (5) (i.e., the value of dc/D is 0.03 or smaller), the concave curved surfaces of the end portions are surrounded by the softened metal to apply a uniform pressure to the flowing portion. As a result, plastic flow sufficient for welding can be generated by the rotation of the rotating tools. If the ratio dc/D exceeds the range of the formula (5) (i.e., the value of dc/D exceeds 0.03), it is difficult to apply a uniform pressure to the flowing portion described above, and it may be difficult to ensure plastic flow sufficient for welding, which is not preferable. To apply a uniform pressure to the flowing portion, the lower limit of the value of dc/D is preferably 0.01 or larger.

The shapes of base portions of the rotating tools 1 and 8, the base portions being opposite to the end portions of the rotating tools 1 and 8, are not particularly limited as long as the base portions can be attached to a double-sided friction stir welding apparatus known in the related art.

Next, a preferred example of a double-sided friction stir welding method using the rotating tools 1 and 8 according to the disclosed embodiments will be described.

In the double-sided friction stir welding method, more favorable advantageous effects related to improvement in the durability of the rotating tools, suppression of occurrence of joint defects, and an increase in welding speed can be obtained by optimizing the conditions of the following various parameters.

In the disclosed embodiments, the inclination angle α (°) at which the rotation axes of the two rotating tools 1 and 8 are inclined in the welding direction with respect to the normal to the surface of the unwelded portion of the steel strips, the diameter D (u) of the end portions 11 of the rotating tools 1 and 8, and the distance G (mm) between the end portions of the two rotating tools 1 and 8 are preferably controlled so as to satisfy formula (1) and formula (2) below.

(1)Inclination Angle α(°) of Rotating Tools: $0 \leq \alpha \leq 3$ \qquad Formula (1)

FIG. 3(a) and FIG. 3(b) are diagrams illustrating a region that is friction-stirred with the rotating tools according to the disclosed embodiments. FIG. 3(a) is a diagram illustrating the movement of the rotating tools 1 and 8, which are disposed on the front and rear surfaces of the steel strips 4 as illustrated in FIG. 1, in the welding direction in a plan view from the front surfaces of the steel strips 4. FIG. 3(b) illustrates a sectional view taken along line A-A☐ in FIG. 3(a).

As illustrated in FIG. 3(b), the rotation axes of the rotating tools 1 and 8 (a rotation axis 3 of the front-surface-side rotating tool and a rotation axis 10 of the rear-surface-side rotating tool) are preferably inclined backward in the welding direction at an angle α° with respect to a vertical line (normal) 6, which extends in the direction perpendicular to the steel strips 4, during welding. In other words, the rotating tools 1 and 8 are preferably inclined in such a manner that the proximal ends of the rotating tools 1 and 8 are positioned more forward than the distal ends of the rotating tools 1 and 8 in the welding direction. As a result, a load that is otherwise applied to the rotating tools 1 and 8 in the horizontal direction (bending direction) during welding can be dispersed as force components that cause compression in the axial directions.

The rotating tools 1 and 8 need to be made of a material that is harder than the steel strips 4 and may be made of, for example, a material having poor toughness, such as a ceramic. In this case, application of a force to the rotating tools 1 and 8 in the bending direction may locally concentrate stress and in turn results in breakage of the rotating tools 1 and 8. To avoid this situation, the rotation axes 3 and 10 of the rotating tools 1 and 8 are inclined at a predetermined angle (α°) as described above, so that the load applied to the rotating tools 1 and 8 can be received as force components that cause compression in the axial direction to reduce the force in the bending direction. As a result, the durability of each of the rotating tools 1 and 8 can be further improved.

The above-mentioned advantageous effects are obtained at an inclination angle α of 0 degrees or greater. If the inclination angle α exceeds 3°, the front and rear surfaces of the welded portion may become recessed, and this may adversely affect the joint strength. The inclination angle of the rotation axis of each of the rotating tools 1 and 8 is preferably 0≤α≤3.

The inclination angle α is more preferably 1° or greater and more preferably 2° or less.

(2) Distance G(mm) Between End Portions of Two Rotating Tools 1 and 8: $0.25 \times t - 0.2 \times D \times \sin\alpha \leq G \leq 0.8 \times t - 0.2 \times D \times \sin\alpha$   Formula (2)

where t: the thickness (mm) of the unwelded portion of the steel strip 4, D: the diameter (mm) of the end portions of the rotating tools 1 and 8, and α: the inclination angle (°) of the rotating tools 1 and 8. Here, t represents the thickness (mm) of each steel strip for butt welding of the steel strips, or the total thickness (mm) of the overlapped steel strips for lap welding of the steel strips.

In double-sided friction stir welding, it is important to control the distance G between the end portions of the opposing rotating tools 1 and 8 in order to uniformly provide a sufficient temperature rise and a sufficient shear stress in the thickness direction during welding. Specifically, the distance G between the end portions of the rotating tools 1 and 8 is preferably controlled (adjusted) within the range of the formula (2) by using the thickness t of the unwelded portion of the steel strips 4, the diameter D of the end portion of each of the rotating tools 1 and 8, and the inclination angle α of each of the rotating tools 1 and 8.

For butt welding illustrated in FIG. 1, the thickness t of the unwelded portion of the steel strips 4 refers to the thickness of one steel strip 4. For lap welding illustrated in FIG. 2, the thickness t of the unwelded portion of the steel strips 4 refers to the total thickness of the overlapped steel strips 4. The inclination angle α of each of the two rotating tools 1 and 8 may be the same angle. The diameter D of the end portion of each of the rotating tools 1 and 8 refers to the end diameter (pin diameter) of the end portion 11 in a cross section including the corresponding rotation axis in the direction perpendicular to the steel strips, where the end portion 11 has the planar shape or the curved shape (concave or convex curved shape) illustrated in FIG. 5(a) to FIG. 7(b).

In the case where the rotating tools 1 and 8 are not inclined (i.e., the inclination angle α of each of the rotating tools 1 and 8 is 0°), the lower limit and the upper limit of the distance G between the end portions (reference signs 2 and 9 in FIG. 3(b)) of the rotating tools 1 and 8 are respectively set to 0.25×t and 0.8× t.

In the case where the rotating tools 1 and 8 are inclined (i.e., the inclination angle α of each of the rotating tools 1 and 8 is 0<α≤3), or in the case where the diameter D of the end portion of each of the rotating tools 1 and 8 is increased in order to increase the contact area between the end portion of the rotating tool 1 and the front surfaces of the steel strips 4 and the contact area between the end portion of the rotating tool 8 and the rear surfaces of the steel strips 4, the distance G between the rotating tools 1 and 8 needs to be set smaller. In this case, as expressed by the formula (2), the lower limit of G may be obtained by subtracting 0.2×D×sin α from 0.25×t and the upper limit of G may be obtained by subtracting 0.2×D×sin α from 0.8×t.

As described above, when the distance G between the end portions of the rotating tools 1 and 8 is controlled in the range of the formula (2), the end portions of the rotating tools 1 and 8 opposing each other are pressed against the front and rear surfaces of the steel strips 4 with a sufficient load, and heat generation and plastic flow in the welded portion are sufficiently promoted. As a result, plastic flow is promoted uniformly in the thickness direction, and a joint (welded portion) in a favorable state can be obtained. If the value of the distance G exceeds the upper limit in the formula (2), the end portions of the rotating tools 1 and 8 cannot press the front and rear surfaces of the steel strips 4 (workpieces) with a sufficient load, and the above-mentioned advantageous effects may not be obtained. If the value of the distance G falls below the lower limit in the formula (2), the front and rear surfaces of the welded portion may become recessed, and this may adversely affect the joint strength.

The value of the distance G is preferably (0.4× t−0.2× D× sin α) or greater and preferably (0.7× t−0.2× D× sin α) or less.

As illustrated in FIG. 3(b), the distance G corresponds to the shortest length in the vertical direction between the end surface of the rotating tool (front-surface-side rotating tool) 1 and the end surface of the rotating tool (rear-surface-side rotating tool) 8, which oppose each other.

The other welding conditions may be set in a conventional manner. For example, the rotational speed of each of the rotating tools 1 and 8 is preferably 100 to 5,000 r/min and more preferably 500 to 3,000 r/min in the double-sided friction stir welding apparatus and the double-sided friction stir welding method according to the disclosed embodiments. At a rotational speed in these ranges, deterioration in mechanical properties due to excessive heat input can be suppressed while a favorable surface profile is maintained. The welding speed is preferably 1,000 mm/min or higher and is more preferably increased to 2,000 mm/min or higher.

For welding of steel strips in-process, the welding method of the disclosed embodiments can be preferably used for welding common structural steels and carbon steels, such as rolled steels for welded structure in Japanese industrial standards of (JIS) G 3106 and carbon steels for machine structural use in JIS G 4051. The welding method of the disclosed embodiments can be favorably used for high-strength structural steels having a tensile strength of 800 MPa or greater. Even in this case, the strength of the welded portion is 85% or more, preferably 90% or more, and more preferably 95% or more of the tensile strength of a steel sheet (base material).

The welded portion of steel strips undergoes bending or compressive deformation during the production process. Erichsen test is used to determine whether the welded portion is properly welded and resistant to such deformation. In Erichsen test, the welded portion is clamped in a die, and a semi-spherical punch is pressed into the welded portion. Erichsen test is conducted to measure the indentation depth until cracking occurs, and the indentation depth is used to evaluate the performance of the welded portion.

Figure 14:
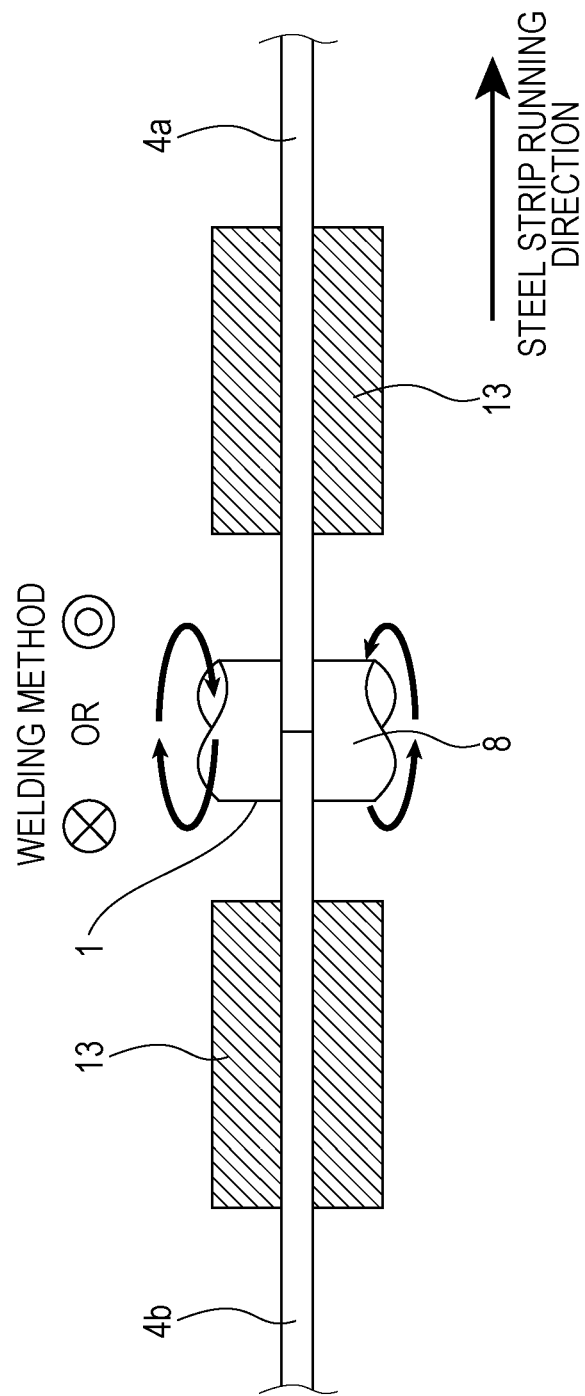
FIG. 14 is a schematic diagram illustrating a method for welding steel strips (a preceding steel strip and a following steel strip) together by using a double-sided friction stir welding apparatus according to the disclosed embodiments, which is an example of butt welding.

Double-sided friction stir welding of steel strips uses a double-sided friction stir welding apparatus including two rotating tools 1 and 8 of the disclosed embodiments, a holding device 13 (described in FIG. 14), and a controlling device (not illustrated) that controls the rotating tools, as illustrated in FIG. 1 and other figures. The controlling device controls, for example, the inclination angle of each of the rotating tools 1 and 8, the distance between the end portions of the rotating tools, the welding speed, the rotational speed of the rotating tools so as to satisfy the welding conditions (1) and (2). In FIG. 14, the right side of the figure corresponds to the front side in the traveling direction (steel strip running direction), and the left side of the figure corresponds to the back side in the traveling direction. The holding device 13 holds the front and rear surfaces of the preceding steel strip 4a and the following steel strip 4b to fix both the steel strips. As the rotating tools 1 and 8 operate in a portion (butt portion) where the steel strips oppose each other so as to move in the width direction of the steel strips (the direction from the back to the front in the figure), the steel strips are welded together.

According to the rotating tools 1 and 8 of the disclosed embodiments, the durability of each of the rotating tools 1 and 8 can be improved as described above. When the end portions of the rotating tools each have the above-mentioned shape, and the opposing rotating tools 1 and 8 rotate in opposite directions to each other, the steel strips undergo a sufficient temperature rise and a sufficient shear stress during welding. As a result, occurrence of defects in the welded portion can be suppressed, and the welding speed can be increased.

Next, methods and facilities for producing a cold-rolled steel strip and a coated steel strip according to the disclosed embodiments will be described. The double-sided friction stir welding apparatus (double-sided friction stir welding method) according to the disclosed embodiments described above can be used in a facility for producing a cold-rolled steel strip (a method for producing a cold-rolled steel strip) and a facility for producing a coated steel strip (a method for producing a coated steel strip).

In a method for producing a cold-rolled steel strip of the related art, a coil welded portion may break in production lines. This has recently become more noticeable as a problem to be solved in the production of high strength cold rolled steel sheets. The application of the technique of double-sided friction stir welding according to the disclosed embodiments described above to production of cold-rolled steel strips or the like can prevent breakage and embrittlement of welded portions of the obtained cold-rolled steel strips or the like to improve material properties, solving the problem of the related art described above.

The facility for producing a cold-rolled steel strip according to the disclosed embodiments includes at least the double-sided friction stir welding apparatus described above and, as necessary, a pickling unit, a cold rolling unit, and an annealing unit. The facility for producing a coated steel strip according to the disclosed embodiments further includes a coating unit in addition to these units.

The method for producing a cold-rolled steel strip according to the disclosed embodiments involves welding the tailing end of a preceding steel strip and the leading end of a following steel strip by double-sided friction stir welding described above and then cold rolling the welded steel strips by using the cold rolling unit (cold rolling process) to produce cold-rolled steel strips. Cold rolling may be preceded by pickling using the pickling unit as necessary. Cold rolling may be followed by annealing the cold-rolled steel strips (annealing process) using the annealing unit as necessary.

In the method for producing a coated steel strip according to the disclosed embodiments, the cold-rolled steel strips obtained after the cold rolling process and the annealing process are subjected to a coating process using a coating unit to produce coated steel strips.

The use of the double-sided friction stir welding apparatus (and the double-sided friction stir welding method) according to the disclosed embodiments in production of cold-rolled steel strips and coated steel strips can reduce defects in the welded portion of the obtained cold-rolled steel strips and the produced coated steel strips and can ensure sufficient joint strength.

EXAMPLES

The operations and effects of the disclosed embodiments will be described below by using Examples. The disclosed embodiments are not limited to the Examples below.

Double-sided friction stir welding was conducted by using steel sheets having the thickness, the chemical composition, the tensile strength, and the Vickers hardness described in Table 1. In Examples, lap welding was performed on some of the steel sheets, and butt welding was performed on the rest of the steel sheets.

For butt welding, two steel sheets of the same type were arranged side by side to form joint butt surfaces having no groove angle, which is so-called square groove, and having a surface condition similar to that of a milled surface. The rotating tools were pressed against the butt portion from both a first surface (front surface) and a second surface (rear surface) and moved in the welding direction, whereby the steel sheets were welded together.

For lap welding, two steel sheets of the same type were arranged so as to overlap each other, and the rotating tools were pressed against the overlap portion of the steel sheets from both a first surface (front surface) and a second surface (rear surface), whereby the steel sheets were welded together. The welding length for one process was 0.5 m.

For both butt welding and lap welding, two rotating tools were rotated in opposite directions to each other during welding. In other words, the rotating tools rotate in the same direction when the end portions of the tools are viewed from the front. The welding conditions of friction stir welding are described in Table 2-1 and Table 2-2. In the welding, eight types of rotating tools having the cross-sectional dimensions and the shapes illustrated in FIG. 4(a) to FIG. 7(b) were used. The "shape" column in Table 2-1 and Table 2-2 presents one of FIG. 4(a) to FIG. 7(b). These rotating tools were made of tungsten carbide (WC) having a Vickers hardness of 1,090. The rotating tools having no probe or spiral stepped portion as illustrated in FIG. 5(a), FIG. 6(a), and FIG. 7(a) were used in the Examples. Since the spirals run clockwise in the rotating tools having no probe and having spiral stepped portions as illustrated in FIG. 5(b), FIG. 6(b), and FIG. 7(b), the rotation of the rotating tools was counterclockwise in the Examples, and the rotation of the rotating tools was clockwise in Comparative Examples. The rotating tools corresponding to "stepwise" in the "condition of stepped portions" column in Table 2-1 and Table 2-2 are as illustrated in FIG. 8(b), and the rotating tools corresponding to "groove-shaped" are as illustrated in FIG. 8(c). The rotating tools having a probe as illustrated in FIG. 4(a) and FIG. 4(b) were used in the Comparative Examples.

TABLE 1

| Number | Thickness (mm) | Chemical Composition (mass %) | | | | | Tensile Strength (MPa) | Vickers Hardness |
| --- | --- | --- | --- | --- | --- | --- | --- | --- |
| | | C | Si | Mn | P | S | | |
| 1 | 1.6 | 0.3 | 0.21 | 0.69 | 0.012 | 0.003 | 1010 | 337 |
| 2 | 2.4 | 0.16 | 0.07 | 0.69 | 0.016 | 0.009 | 425 | 142 |
| 3 | 1.2 | 0.3 | 0.21 | 0.69 | 0.012 | 0.003 | 1012 | 339 |

TABLE 2-1

| | Sample steel sheet | Thickness of sample steel sheet (mm) | Type of joint | Shape (*1) | Front and rear surface side welding tools | | | | | | |
| --- | --- | --- | --- | --- | --- | --- | --- | --- | --- | --- | --- |
| | | | | | Vickers hardness of rotating tool material | Diameter D of end portions of front and rear surface side rotating tools (mm) | Height dv of convex surfaces of front and rear surface side rotating tools (mm) | Depth dc of concave surfaces of front and rear surface side rotating tools (mm) | dv/D | dc/D | Condition of stepped portions |
| Example 1 | 1 | 1.6 | Butt | FIG. 7(b) | 1090 | 8 | — | 0.2 | — | 0.025 | Stepwise |
| Example 2 | 1 | 1.6 | Butt | FIG. 7(b) | 1090 | 13 | — | 0.3 | — | 0.023 | Groove-shaped |
| Example 3 | 1 | 1.6 | Butt | FIG. 7(b) | 1090 | 30 | — | 0.3 | — | 0.010 | Groove-shaped |
| Example 4 | 1 | 1.6 | Butt | FIG. 7(a) | 1090 | 8 | — | 0.2 | — | 0.025 | — |
| Example 5 | 1 | 1.6 | Butt | FIG. 7(a) | 1090 | 13 | — | 0.3 | — | 0.023 | — |
| Example 6 | 1 | 1.6 | Butt | FIG. 7(a) | 1090 | 30 | — | 0.3 | — | 0.010 | — |
| Example 7 | 2 | 2.4 | Butt | FIG. 5(b) | 1090 | 13 | — | — | — | — | Stepwise |
| Example 8 | 2 | 2.4 | Butt | FIG. 5(b) | 1090 | 20 | — | — | — | — | Groove-shaped |
| Example 9 | 2 | 2.4 | Butt | FIG. 5(b) | 1090 | 40 | — | — | — | — | Groove-shaped |
| Example 10 | 1 | 1.6 | Butt | FIG. 5(a) | 1090 | 8 | — | — | — | — | — |
| Example 11 | 1 | 1.6 | Butt | FIG. 5(a) | 1090 | 13 | — | — | — | — | — |
| Example 12 | 1 | 1.6 | Butt | FIG. 5(a) | 1090 | 30 | — | — | — | — | — |
| Example 13 | 1 | 1.6 | Butt | FIG. 6(b) | 1090 | 8 | 0.4 | — | 0.050 | — | Groove-shaped |
| Example 14 | 1 | 1.6 | Butt | FIG. 6(b) | 1090 | 13 | 0.5 | — | 0.038 | — | Stepwise |
| Example 15 | 1 | 1.6 | Butt | FIG. 6(b) | 1090 | 30 | 0.5 | — | 0.017 | — | Stepwise |
| Example 16 | 2 | 2.4 | Butt | FIG. 6(a) | 1090 | 13 | 0.5 | — | 0.038 | — | — |
| Example 17 | 2 | 2.4 | Butt | FIG. 6(a) | 1090 | 20 | 0.5 | — | 0.025 | — | — |
| Example 18 | 2 | 2.4 | Butt | FIG. 6(a) | 1090 | 40 | 0.5 | — | 0.013 | — | — |
| Example 19 | 1 | 1.6 | Butt | FIG. 7(b) | 1090 | 12 | — | 0.4 | — | 0.033 | Stepwise |

| | Arrangement of rotating tools | | | | | |
| --- | --- | --- | --- | --- | --- | --- |
| | Inclination angle α of front and rear surface side rotating tools (°) | Distance G between end portions of front and rear surface side rotating tools (mm) | Tool rotation direction when end portions of rotating tools are viewed from front | Rotational speed RS of rotating tools | | Welding speed TS (m/min) |
| | | | | Front surface side (time/min) | Rear surface side (time/min) | |
| Example 1 | 0 | 0.80 | Counterclockwise | 3000 | 3000 | 1.2 |
| Example 2 | 1.5 | 1.00 | Counterclockwise | 1300 | 1300 | 2.0 |
| Example 3 | 1.5 | 1.00 | Counterclockwise | 800 | 800 | 1.2 |
| Example 4 | 0 | 0.80 | Counterclockwise | 3000 | 3000 | 1.2 |
| Example 5 | 1.5 | 1.00 | Counterclockwise | 1300 | 1300 | 2.0 |
| Example 6 | 1.5 | 1.00 | Counterclockwise | 800 | 800 | 1.2 |
| Example 7 | 0 | 1.40 | Counterclockwise | 3000 | 3000 | 1.0 |
| Example 8 | 1.5 | 1.40 | Counterclockwise | 2500 | 2500 | 1.5 |

TABLE 2-1-continued

| | | | | | | | |
|---|---|---|---|---|---|---|---|
| Example 9 | 1.5 | 1.40 | Counterclockwise | 1500 | 1500 | 1.0 | |
| Example 10 | 0 | 0.80 | Counterclockwise | 3000 | 3000 | 1.0 | |
| Example 11 | 1.5 | 1.00 | Counterclockwise | 1300 | 1300 | 1.5 | |
| Example 12 | 1.5 | 1.00 | Counterclockwise | 800 | 800 | 1.0 | |
| Example 13 | 0 | 0.60 | Counterclockwise | 3000 | 3000 | 1.2 | |
| Example 14 | 0 | 0.60 | Counterclockwise | 1300 | 1300 | 2.0 | |
| Example 15 | 0 | 0.60 | Counterclockwise | 800 | 800 | 1.2 | |
| Example 16 | 0 | 1.40 | Counterclockwise | 3000 | 3000 | 1.0 | |
| Example 17 | 0 | 1.40 | Counterclockwise | 2500 | 2500 | 1.2 | |
| Example 18 | 0 | 1.40 | Counterclockwise | 1500 | 1500 | 1.0 | |
| Example 19 | 1.5 | 0.80 | Counterclockwise | 1300 | 1300 | 2.0 | |

(*1): The rotating tool in FIG. 4(a) has a pin, a shoulder diameter of 12 mm, and a pin length of 0.5 mm, and the rotating tool in FIG. 4(b) has a pin, a shoulder diameter of 20 mm, and a pin length of 0.7 mm.
The rotating tool in FIG. 5(a) has no pin, an end portion with a planar shape, and no spiral stepped portion, and the rotating tool in FIG. 5(b) has no pin, an end portion with a planar shape, and a spiral stepped portion (clockwise direction).
The rotating tool in FIG. 6(a) has no pin, an end portion with a convex curved shape, and no spiral stepped portion, and the rotating tool in FIG. 6(b) has no pin, an end portion with a convex curved shape, and a spiral stepped portion (clockwise direction).
The rotating tool in FIG. 7(a) has no pin, an end portion with a concave curved shape, and no spiral stepped portion, and the rotating tool in FIG. 7(b) has no pin, an end portion with a concave curved shape, and a spiral stepped portion (clockwise direction).

TABLE 2-2

| | Sample steel sheet | Thickness of sample steel sheet (mm) | Type of joint | Front and rear surface side welding tools | | | | | | Condition of stepped portions |
|---|---|---|---|---|---|---|---|---|---|---|
| | | | | Shape (*1) | Vickers hardness of rotating tool material | Diameter D of end portions of front and rear surface side rotating tools (mm) | Height dv of convex surfaces of front and rear surface side rotating tools (mm) | Depth dc of concave surfaces of front and rear surface side rotating tools (mm) | dv/D | dc/D | |
| Example 20 | 1 | 1.6 | Butt | FIG. 5(b) | 1090 | 6 | — | — | — | — | Groove-shaped |
| Example 21 | 1 | 1.6 | Butt | FIG. 6(b) | 1090 | 9 | 0.6 | — | 0.067 | — | Stepwise |
| Example 22 | 1 | 1.6 | Butt | FIG. 7(a) | 1090 | 12 | — | 0.4 | — | 0.033 | — |
| Example 23 | 1 | 1.6 | Butt | FIG. 5(a) | 1090 | 6 | — | — | — | — | — |
| Example 24 | 1 | 1.6 | Butt | FIG. 6(a) | 1090 | 9 | 0.6 | — | 0.067 | — | — |
| Example 25 | 3 | 1.2 | Lap | FIG. 5(b) | 1090 | 20 | — | — | — | — | Groove-shaped |
| Example 26 | 3 | 1.2 | Lap | FIG. 5(b) | 1090 | 40 | — | — | — | — | Groove-shaped |
| Example 27 | 3 | 1.2 | Lap | FIG. 6(a) | 1090 | 13 | 0.5 | — | 0.038 | — | — |
| Comparative Example 1 | 1 | 1.6 | Butt | FIG. 7(b) | 1090 | 8 | — | 0.2 | — | 0.025 | Stepwise |
| Comparative Example 2 | 2 | 2.4 | Butt | FIG. 5(b) | 1090 | 13 | — | — | — | — | Stepwise |
| Comparative Example 3 | 1 | 1.6 | Butt | FIG. 6(b) | 1090 | 30 | 0.5 | — | 0.017 | — | Stepwise |
| Comparative Example 4 | 3 | 1.2 | Lap | FIG. 5(b) | 1090 | 20 | — | — | — | — | Groove-shaped |
| Comparative Example 5 | 1 | 1.6 | Butt | FIG. 4(a) | 1090 | 13 | — | 0.3 | — | 0.023 | — |
| Comparative Example 6 | 1 | 1.6 | Butt | FIG. 4(a) | 1090 | 13 | — | 0.3 | — | 0.023 | — |
| Comparative Example 7 | 1 | 1.6 | Butt | FIG. 4(a) | 1090 | 13 | — | 0.3 | — | 0.023 | — |
| Comparative Example 8 | 2 | 2.4 | Butt | FIG. 4(b) | 1090 | 20 | — | 0.3 | — | 0.015 | — |
| Comparative Example 9 | 2 | 2.4 | Butt | FIG. 4(b) | 1090 | 20 | — | 0.3 | — | 0.015 | — |
| Comparative Example 10 | 3 | 1.2 | Lap | FIG. 4(b) | 1090 | 20 | — | 0.3 | — | 0.015 | — |

| | Arrangement of rotating tools | | | Rotational speed RS of rotating tools | | |
|---|---|---|---|---|---|---|
| | Inclination angle α of front and rear surface side rotating tools (°) | Distance G between end portions of front and rear surface side rotating tools (mm) | Tool rotation direction when end portions of rotating tools are viewed from front | Front surface side (time/min) | Rear surface side (time/min) | Welding speed TS (m/min) |
| Example 20 | 1.5 | 0.80 | Counterclockwise | 3000 | 3000 | 1.0 |
| Example 21 | 0 | 0.80 | Counterclockwise | 3000 | 3000 | 1.0 |
| Example 22 | 1.5 | 0.80 | Counterclockwise | 1300 | 1300 | 2.0 |
| Example 23 | 1.5 | 0.80 | Counterclockwise | 3000 | 3000 | 1.0 |
| Example 24 | 0 | 0.80 | Counterclockwise | 3000 | 3000 | 1.0 |
| Example 25 | 1.5 | 1.40 | Counterclockwise | 2500 | 2500 | 1.5 |

TABLE 2-2-continued

| | | | | | | |
|---|---|---|---|---|---|---|
| Example 26 | 1.5 | 1.40 | Counterclockwise | 1500 | 1500 | 1.0 |
| Example 27 | 0 | 1.40 | Counterclockwise | 3000 | 3000 | 1.0 |
| Comparative Example 1 | 0 | 0.80 | Clockwise | 3000 | 3000 | 1.2 |
| Comparative Example 2 | 0 | 1.40 | Clockwise | 3000 | 3000 | 1.0 |
| Comparative Example 3 | 0 | 0.60 | Clockwise | 800 | 800 | 1.2 |
| Comparative Example 4 | 1.5 | 1.40 | Clockwise | 2500 | 2500 | 1.5 |
| Comparative Example 5 | 0 | 1.30 | Counterclockwise | 800 | 800 | 1.0 |
| Comparative Example 6 | 1.5 | 1.20 | Counterclockwise | 1300 | 1300 | 2.0 |
| Comparative Example 7 | 3 | 1.30 | Counterclockwise | 800 | 800 | 1.0 |
| Comparative Example 8 | 1.5 | 1.80 | Counterclockwise | 3000 | 3000 | 1.0 |
| Comparative Example 9 | 0.0 | 2.00 | Counterclockwise | 1600 | 1600 | 1.0 |
| Comparative Example 10 | 0.0 | 2.00 | Counterclockwise | 1600 | 1600 | 1.0 |

(*1): The rotating tool in FIG. 4(a) has a pin, a shoulder diameter of 12 mm, and a pin length of 0.5 mm, and the rotating tool in FIG. 4(b) has a pin, a shoulder diameter of 20 mm, and a pin length of 0.7 mm.
The rotating tool FIG. 5(a) has no pin, an end portion with a planar shape, and no spiral stepped portion, and the rotating tool in FIG. 5(b) has no pin, an end portion with a planar shape, and a spiral stepped portion (clockwise direction).
The rotating tool in FIG. 6(a) has no pin, an end portion with a convex curved shape, and no spiral stepped portion, and the rotating tool in FIG. 6(b) has no pin, an end portion with a convex curved shape, and a spiral stepped portion (clockwise direction).
The rotating tool in FIG. 7(a) has no pin, an end portion with a concave curved shape, and no spiral stepped portion, and the rotating tool in FIG. 7(b) has no pin, an end portion with a concave curved shape, and a spiral stepped portion (clockwise direction).

The following evaluation was conducted by using the obtained welding joint.

(I) Presence or Absence of Surface Defects in Observation of Joint Appearance

Observation was performed by using portions of the obtained welding joints that were welded at the welding speeds shown in Table 2-1 and Table 2-2. The presence or absence of surface defects was visually determined on the basis of whether a groove-shaped portion in an unwelded state was observed due to insufficient plastic flow or whether a welded portion was observed in a recessed manner because of the distance G between the shoulder portions of the welding tools being too narrow. If the groove-shaped portion in an unwelded state or the welded portion formed in a recessed manner was observed as a surface defect, the depth Dd (mm) of the surface defect was measured using a laser displacement meter and evaluated on the basis of the following criteria.
<Criteria>
No: None of the surface defects described above was observed.
Acceptable: One of the surface defects described above was observed, but the ratio (Dd/t) of the depth Dd (mm) to the thickness t (mm) of the steel sheets was 0.1 or less.
Yes: One of the surface defects described above was observed, and the ratio (Dd/t) of the depth Dd (mm) to the thickness t (mm) of the steel sheets exceeded 0.1. Alternatively, the groove-shaped portion in an unwelded state extended from the front surface to the rear surface. If the groove-shaped portion in an unwelded state extended from the front surface to the rear surface, the welding was considered unsuccessful, and the internal defects and joint strength were not evaluated.

(II) Presence or Absence of Internal Defects in Observation of Cross Sections of Joints Observation was performed by using portions of the obtained welding joints that were welded at the welding speeds shown in Table 2-1 and Table 2-2. The cross sections were prepared by cutting the portions at a position of 20 mm from the welding start end, at a position of 20 mm from the welding finish end, and at an intermediate position between the ends to prepare test specimens. The presence or absence of internal defects was determined on the basis of whether the unwelded state formed in the welded portion due to insufficient plastic flow was observed by using an optical microscope (magnification: 10 times), and evaluated on the basis of the following criteria.
<Criteria>
No: The unwelded state formed in a tunnel shape was not observed at any of the three positions mentioned above.
Acceptable: The unwelded state formed in the welded portion was observed at one of the three positions mentioned above.
Yes: The unwelded state formed in the welded portion was observed at two or more of the three positions mentioned above.

Table 3 shows the results of determination of (I) the presence or absence of surface defects by observing the joint appearance when the welding was performed once with a welding length of 0.5 m and the results of determination of (II) the presence or absence of internal defects by observing the cross sections of the joint. Table 3 also shows the tensile strength and the indentation depth. The tensile strength was measured in a tensile test (JIS Z 3121) using tensile test specimens each taken from the obtained welding joints and having the dimensions of a No. 1 test specimen defined by JIS Z 3121. The indentation depth in plastic deformation until cracking in the welded portion was measured using an Erichsen tester.

Table 3 indicates that, in the butt joints of Examples 1 to 24 and the lap joints of Examples 25 to 27, a non-defective welded state was obtained even at high welding speeds of 1.0 m/min or higher, with no surface defect found by observation of the joint appearance or no internal defect found by observation of the cross sections of each joint. The joint strength was 95% or more of the tensile strength of the steel sheets serving as base materials, and the indentation depth until cracking in the welded portion was 5 mm or more in the Erichsen test.

In the butt joints of Comparative Examples 1 to 3, welding was performed by using rotating tools each having no probe and having spiral stepped portions extending in the clockwise direction while the rotation direction of each of the rotating tools was set to the clockwise direction. Surface defects and internal defects were observed in the obtained joints, and a non-defective welded state was not obtained. The joint strength was 70% or less of the tensile strength of the steel sheets serving as base materials, and the indentation depth until cracking in the welded portion was 4 mm or less in the Erichsen test.

In the lap joint of Comparative Example 4, welding was performed by using rotating tools each having no probe and having spiral stepped portions extending in the clockwise direction while the rotation direction of each of the rotating tools was set to the clockwise direction. Surface defects and internal defects were observed in the obtained joint, and a non-defective welded state was not obtained. The joint strength was 70% or less of the tensile strength of the steel sheets serving as base materials, and the indentation depth until cracking in the welded portion was 4 mm or less in the Erichsen test.

In the butt joints of Comparative Examples 5 to 9, rotating tools each having a pin were used under the conditions where D (the diameter (mm) of the end portion of each rotating tool), a (the inclination angle (°) of each rotating tool), and G (the distance (mm) between the end portions of the two rotating tools) all satisfy the formulas (1), (2) and (3).

In the butt joints of Comparative Examples 5 to 9, a non-defective welded state was obtained even at high welding speeds of 1.0 m/min or higher, with no surface defect found by observation of the joint appearance or no internal defect found by observation of the cross sections of each joint. It was confirmed that the joint strength and the Erichsen test showed favorable results. However, it was also confirmed that the rotating tools showed poor durability.

In the lap joint of Comparative Example 10, a non-defective welded state was obtained even at high welding speeds of 1.0 m/min or higher, with no surface defect found by observation of the joint appearance or no internal defect found by observation of the cross sections of the joint. It was confirmed that the joint strength and the Erichsen test showed favorable results. However, it was also confirmed that the rotating tools showed poor durability.

TABLE 3

|  | Presence of surface defects in observation of joint appearance | Presence of internal defects in observation of cross sections of joint | Tensile strength (MPa) | Erichsen test: indentation depth until cracking in welded portion (mm) |
|---|---|---|---|---|
| Example 1 | No | No | 1009 | 8.3 |
| Example 2 | No | No | 1012 | 8.4 |
| Example 3 | No | No | 1007 | 8.2 |
| Example 4 | No | No | 1005 | 8.2 |
| Example 5 | No | No | 1006 | 8.3 |
| Example 6 | No | No | 1001 | 8.1 |
| Example 7 | No | No | 430 | 8.8 |
| Example 8 | No | No | 433 | 9.0 |
| Example 9 | No | No | 432 | 9.0 |
| Example 10 | No | No | 1005 | 8.1 |
| Example 11 | No | No | 1002 | 8.2 |
| Example 12 | No | No | 1000 | 8.0 |
| Example 13 | No | No | 1012 | 8.3 |
| Example 14 | No | No | 1015 | 8.3 |
| Example 15 | No | No | 1007 | 8.1 |
| Example 16 | No | No | 430 | 8.8 |
| Example 17 | No | No | 433 | 8.9 |
| Example 18 | No | No | 432 | 8.8 |
| Example 19 | No | Acceptable | 990 | 7.8 |
| Example 20 | Acceptable | Acceptable | 999 | 7.8 |
| Example 21 | Acceptable | No | 995 | 7.9 |
| Example 22 | No | Acceptable | 980 | 7.5 |
| Example 23 | Acceptable | Acceptable | 987 | 7.7 |
| Example 24 | Acceptable | No | 983 | 7.6 |
| Example 25 | No | No | 1011 | 5.5 |
| Example 26 | No | No | 1006 | 5.2 |
| Example 27 | Acceptable | No | 1002 | 5.2 |
| Comparative Example 1 | Yes (unwelded portion) | Yes | 587 | 3.3 |
| Comparative Example 2 | Yes (unwelded portion) | Yes | 274 | 2.5 |
| Comparative Example 3 | Yes (unwelded portion) | Yes | 487 | 2.8 |
| Comparative Example 4 | Yes (unwelded portion) | Yes | 657 | 2.1 |
| Comparative Example 5 | No | No | 1001 | 7.9 |
| Comparative Example 6 | No | No | 1003 | 8.0 |
| Comparative Example 7 | No | No | 997 | 7.8 |
| Comparative Example 8 | No | No | 424 | 8.7 |
| Comparative Example 9 | No | No | 422 | 8.7 |
| Comparative Example 10 | No | No | 995 | 4.2 |

Table 4 shows the number of repeated welding operations with a welding length of 0.5 m, out of the cumulative number of welding operations, in which a non-defective joint was obtained with a probability of 90% or more while no internal defect was found by observation of the cross sections of the joint. As shown in Table 4, in the butt joints of Examples 1 to 24 and the lap joints of Examples 25 to 27, the number of welding operations in which a non-defective joint was obtained with a probability of 90% or more was 13 or more.

In the butt joints of Comparative Examples 1 to 3, welding was performed by using rotating tools each having no probe and having spiral stepped portions extending in the clockwise direction while the rotation direction of each of the rotating tools was set to the clockwise direction. In Comparative Examples 1 to 3, the number of welding operations in which a non-defective joint was obtained with a probability of 90% or more was 0.

In the lap joint of Comparative Example 4, welding was performed by using rotating tools each having no probe and having groove-shaped stepped portions extending in the clockwise direction while the rotation direction of each of the rotating tools was set to the clockwise direction. In Comparative Example 4, the number of welding operations in which a non-defective joint was obtained with a probability of 90% or more was 0.

In the butt joints of Comparative Examples 5 to 9, welding was performed by using rotating tools each having a pin. The number of welding operations in which a non-defective joint was obtained with a probability of 90% or more was 10 or less.

In the lap joints of Comparative Example 10, welding was performed by using rotating tools each having a pin. The number of welding operations in which a non-defective joint was obtained with a probability of 90% or more was 10 or less.

As described above, the use of rotating tools each having no probe and having spiral stepped portions caused joint defects or problems with joint strength in welding where the spirals of the spiral stepped portions run in the same direction as the rotation direction of the rotating tools. It was revealed that rotating tools each having a pin showed poor durability.

Table 3 reveals that the use of rotating tools each having spiral stepped portions increased the weld strength of joints, from the results of the experiments under the same conditions except for the presence or absence of the spiral stepped portions, which are pairs of Examples, that is, Examples 1 and 4, Examples 2 and 5, Examples 3 and 6, Examples 19 and 22, Examples 20 and 23, and Examples 21 and 24.

The results of Examples 19 and 22 in which experiments were conducted under the conditions that did not satisfy the formula (5) below indicate that the conditions above the range of the formula (5) may affect ensuring of plastic flow sufficient for welding and may lead to occurrence of internal defects although the surface defects are evaluated as "no". In other words, when rotating tools each having a concave surface further satisfy the condition of the formula (5), occurrence of surface defects and internal defects can be more effectively suppressed to provide a joint having a sufficient strength.

$$dc/D \leq 0.03 \qquad \text{Formula (5)}$$

The results of Examples 20 and 23 in which experiments were conducted under the conditions below the lower limit of the range of the formula (3) indicate that the conditions below the lower limit of the range of the formula (3) may affect ensuring of uniform plastic flow in the thickness direction and may lead to occurrence of surface defects or internal defects although the surface defects and the internal defects are evaluated as "acceptable". In other words, when rotating tools each having a planar surface further satisfy the condition of the formula (3), occurrence of surface defects and internal defects can be more effectively suppressed to provide a joint having a sufficient strength.

$$4 \times t \leq D \leq 20 \times t \qquad \text{Formula (3)}$$

The results of Examples 21 and 24 in which experiments were conducted under the conditions that did not satisfy the formula (4) indicate that the conditions above the range of the formula (4) may affect the shape of the surface of the welded portion and may lead to occurrence of surface defects although the surface defects and the internal defects are evaluated as "acceptable". In other words, when rotating tools each having a convex surface further satisfy the condition of the formula (4), occurrence of surface defects and internal defects can be more effectively suppressed to provide a joint having a sufficient strength.

$$dv/D \leq 0.06 \qquad \text{Formula (4)}$$

TABLE 4

| | Number of welding operations in which non-defective joint is obtained with probability of 90% or more |
|---|---|
| Example 1 | 16 |
| Example 2 | 18 |
| Example 3 | 21 |
| Example 4 | 15 |
| Example 5 | 15 |
| Example 6 | 19 |
| Example 7 | 13 |
| Example 8 | 14 |
| Example 9 | 17 |
| Example 10 | 16 |
| Example 11 | 15 |
| Example 12 | 20 |
| Example 13 | 18 |
| Example 14 | 21 |
| Example 15 | 24 |
| Example 16 | 15 |
| Example 17 | 16 |
| Example 18 | 17 |
| Example 19 | 16 |
| Example 20 | 15 |
| Example 21 | 23 |
| Example 22 | 14 |
| Example 23 | 14 |
| Example 24 | 18 |
| Example 25 | 15 |
| Example 26 | 16 |
| Example 27 | 15 |
| Comparative Example 1 | 0 |
| Comparative Example 2 | 0 |
| Comparative Example 3 | 0 |
| Comparative Example 4 | 0 |
| Comparative Example 5 | 10 |
| Comparative Example 6 | 8 |
| Comparative Example 7 | 10 |
| Comparative Example 8 | 7 |
| Comparative Example 9 | 9 |
| Comparative Example 10 | 8 |

The invention claimed is:

1. A double-sided friction stir welding method comprising, in butt welding or lap welding between a tailing end of a preceding steel strip and a leading end of a following steel strip:
    pressing two rotating tools, which are disposed on a first surface and a second surface of a butt portion or overlap portion of the steel strips, against the butt portion or overlap portion of the steel strips; and
    moving the rotating tools in a welding direction while rotating the rotating tools in opposite directions to each other, so that an unwelded portion of the steel strips is softened by frictional heat generated between the rotating tools and the unwelded portion of the steel strips, and the softened portion is stirred with the rotating tools to generate plastic flow so as to weld the steel strips together, wherein the two rotating tools each have an end portion formed to have a shape of one of a circular planar surface, a circular convex curved surface, and a circular concave curved surface, the end portions are each made of a material harder than the steel strips, wherein, when a height of the convex curved surface of each end portion is denoted by dv (mm), a diameter D (mm) of each end portion and the height dy of the convex curved surface satisfy formula (4):

$$dv/D \leq 0.06 \qquad (4),$$

wherein, when a depth of the concave curved surface of each end portion is denoted by dc (mm), the diameter D (mm) of each end portion and the depth dc of the concave curved surface satisfy formula (5):

$$dc/D \leq 0.03 \qquad (5),$$

wherein an inclination angle α(°) at which rotation axes of the two rotating tools are inclined backward in the welding direction with respect to a normal to a surface of the unwelded portion of the steel strips, the diameter D (mm) of each end portion, and a distance G (mm) between the end portions of the two rotating tools satisfy formula (1) and formula (2):

$$0 \leq \alpha \leq 3 \qquad (1)$$

$$0.25 \times t - 0.2 \times D \times \sin \alpha \leq G \leq 0.8 \times t - 0.2 \times D \times \sin \alpha \qquad (2)$$

where t represents a thickness (mm) of each steel strip for butt welding of the steel strips, or a total thickness (mm) of the overlapped steel strips for lap welding of the steel strips, and wherein the diameter D (mm) of each end portion satisfies formula (3):

$$4 \times t \leq D \leq 20 \times t \qquad (3).$$

2. The double-sided friction stir welding method according to claim 1, wherein the end portions each have a spiral stepped portion extending in a direction opposite to a respective rotation direction.

3. A method for producing a cold-rolled steel strip, the method comprising, after welding between the tailing end of the preceding steel strip and the leading end of the following steel strip using the double-sided friction stir welding method according to claim 1, performing cold rolling or performing cold rolling after pickling.

4. The method for producing a cold-rolled steel strip according to claim 3, further comprising performing annealing after the cold rolling.

5. A method for producing a coated steel strip, the method comprising, after welding between the tailing end of the preceding steel strip and the leading end of the following steel strip using the double-sided friction stir welding method according to claim 1, performing cold rolling or performing cold rolling after pickling, and then performing annealing and coating.

* * * * *